United States Patent
Pham Van et al.

(10) Patent No.: US 12,256,096 B2
(45) Date of Patent: Mar. 18, 2025

(54) GLOBAL MOTION ESTIMATION USING ROAD AND GROUND OBJECT LABELS FOR GEOMETRY-BASED POINT CLOUD COMPRESSION

(71) Applicant: QUALCOMM Incorporated, San Diego, CA (US)

(72) Inventors: Luong Pham Van, San Diego, CA (US); Adarsh Krishnan Ramasubramonian, Irvine, CA (US); Bappaditya Ray, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/623,198

(22) Filed: Apr. 1, 2024

(65) Prior Publication Data

US 2024/0251097 A1    Jul. 25, 2024

Related U.S. Application Data

(63) Continuation of application No. 17/558,362, filed on Dec. 21, 2021, now Pat. No. 11,949,909.
(Continued)

(51) Int. Cl.
     *H01L 29/94*      (2006.01)
     *H04N 19/124*      (2014.01)
(Continued)

(52) U.S. Cl.
CPC ......... *H04N 19/527* (2014.11); *H04N 19/124* (2014.11); *H04N 19/139* (2014.11); *H04N 19/177* (2014.11); *H04N 19/597* (2014.11)

(58) Field of Classification Search
CPC .. H04N 19/527; H04N 19/124; H04N 19/139; H04N 19/177; H04N 19/597
See application file for complete search history.

(56) References Cited

U.S. PATENT DOCUMENTS 6,097,698 A *   8/2000   Yang ................ H04Q 11/0478
                                                      370/231
6,239,805 B1 *   5/2001   Deering ................ G06T 9/001
                                                      382/233
(Continued)

FOREIGN PATENT DOCUMENTS

CN      110782465 B      3/2020
EP      3633621 A1      4/2020

OTHER PUBLICATIONS

3DG: "G-PCC Codec Description v8", 131. MPEG Meeting, Jun. 29, 2020-Jul. 3, 2020, Online, (Motion Picture Expert Group or ISO/IEC JTC1/SC29/WG11), Coding of Moving Pictures and Audio, Convenorship: JISC (Japan), No. N19525, Oct. 2, 2020, 142 Pages, Oct. 10, 2020, XP030292244.
(Continued)

*Primary Examiner* — Joseph Suh
(74) *Attorney, Agent, or Firm* — QUALCOMM Incorporated; Espartaco Diaz Hidalgo

(57) ABSTRACT

A device to code a point cloud data that includes a memory configured to store data representing points of a point cloud, and one or more processors implemented in circuitry and configured to: determine height values of points in a point cloud; code a data structure including data that represents a top threshold and a bottom threshold; classify points having height values between the top threshold and the bottom threshold into the set of ground points; classify points having height values above the top threshold or below the bottom threshold into the set of object points. The one or more processors code the ground points and the object
(Continued)

points according to the classifications. The one or more processors code a geometry data unit header that includes data that overrides or refines the data of the data structure for the at least one of the top threshold or the bottom threshold.

20 Claims, 20 Drawing Sheets

Related U.S. Application Data

(60) Provisional application No. 63/171,945, filed on Apr. 7, 2021, provisional application No. 63/131,637, filed on Dec. 29, 2020.

(51) Int. Cl.
*H04N 19/139* (2014.01)
*H04N 19/177* (2014.01)
*H04N 19/527* (2014.01)
*H04N 19/597* (2014.01)

(56) References Cited

U.S. PATENT DOCUMENTS

| | | | |
|---|---|---|---|
| 2003/0108099 A1* | 6/2003 | Nagumo | G06T 9/20 |
| | | | 375/E7.199 |
| 2009/0079876 A1* | 3/2009 | Takeshima | G06T 3/4069 |
| | | | 348/E5.062 |
| 2010/0150242 A1* | 6/2010 | Ozawa | H04N 19/91 |
| | | | 375/E7.123 |
| 2011/0080762 A1 | 4/2011 | Nikolov | |
| 2013/0083162 A1* | 4/2013 | Wang | H04N 13/128 |
| | | | 348/43 |
| 2014/0192050 A1 | 7/2014 | Qiu et al. | |
| 2015/0356357 A1 | 12/2015 | McMANUS et al. | |
| 2016/0256127 A1* | 9/2016 | Lee | A61B 6/5264 |
| 2017/0236288 A1* | 8/2017 | Sundaresan | G06T 7/215 |
| | | | 382/173 |
| 2017/0287143 A1* | 10/2017 | Shimada | H04N 23/6811 |
| 2017/0323423 A1* | 11/2017 | Lin | H04N 19/88 |
| 2018/0007155 A1* | 1/2018 | Saito | H04N 21/2541 |
| 2018/0232947 A1 | 8/2018 | Nehmadi et al. | |
| 2019/0138813 A1* | 5/2019 | Pereira | G06V 20/41 |
| 2019/0156507 A1* | 5/2019 | Zeng | G06F 16/29 |
| 2019/0204076 A1 | 7/2019 | Nishi et al. | |
| 2019/0242711 A1 | 8/2019 | Ingersoll et al. | |
| 2019/0324471 A1* | 10/2019 | Kim | G01S 17/931 |
| 2019/0325089 A1 | 10/2019 | Golparvar-Fard et al. | |
| 2020/0043121 A1* | 2/2020 | Boyce | G06T 15/005 |
| 2020/0050878 A1* | 2/2020 | Badr | G06V 10/98 |
| 2020/0082611 A1 | 3/2020 | Haramaty et al. | |
| 2020/0219286 A1* | 7/2020 | Sinharoy | G06T 7/174 |
| 2020/0280710 A1 | 9/2020 | Vosoughi et al. | |
| 2020/0396479 A1* | 12/2020 | Furht | H04N 19/172 |
| 2020/0396501 A1* | 12/2020 | Lapicque | H04N 21/434 |
| 2021/0000006 A1 | 1/2021 | Ellaboudy et al. | |
| 2021/0051320 A1* | 2/2021 | Tourapis | H04N 19/182 |
| 2021/0092432 A1* | 3/2021 | Rusanovskyy | H04N 19/56 |
| 2021/0116568 A1 | 4/2021 | Kanza et al. | |
| 2021/0192798 A1 | 6/2021 | Lasserre et al. | |
| 2022/0210466 A1 | 6/2022 | Pham Van et al. | |
| 2022/0215596 A1 | 7/2022 | Van Der Auwera et al. | |

OTHER PUBLICATIONS

International Preliminary Report on Patentability—PCT/US2021/064869—The International Bureau of WIPO—Geneva, Switzerland—Jul. 13, 2023.
International Search Report and Written Opinion—PCT/US2021/064869—ISA/EPO—Sep. 9, 2022.
International Search Report and Written Opinion—PCT/US2021/065343—ISA/EPO—Apr. 21, 2022.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Kim J., et al., "[G-PCC] [EM Related] [New Proposal] Road and Objects Segmentation for Global Motion Prediction", 132. MPEG Meeting, Oct. 12, 2020-Oct. 16, 2020, Online, (Motion Picture Expert Group or ISO/IEC JTC1/SC29/WG11), No. m55390, Oct. 13, 2020, 6 Pages, XP030291911.
Lasserre (Blackberry) S., et al., "[PCC] Global Motion Compensation for Point Cloud Compression in TMC3", 124. MPEG, Meeting, Oct. 8, 2018-Oct. 12, 2018, Macao, (Motion Picture Expert Group or ISO/IEC JTC1/SC29/WG11), No. M44751, Oct. 3, 2018 (Oct. 3, 2018), XP030192062, 26 Pages.
Lasserre (Blackberry) S., et al., "[PCC] On Motion Compensation for Geometry Coding in TM3", 122. MPEG Meeting, Apr. 16, 2018-Apr. 20, 2018, San Diego, (Motion Picture Expert Group or ISO/IEC JTC1/SC29/WG11), No. m42521, Apr. 11, 2018, XP030070860.
Lasserre S., "Exploratory Model for Inter-Prediction in G-PCC", 124. MPEG Meeting, Oct. 8, 2018-Oct. 12, 2018, MACAO, (Motion Picture Expert Group or ISO/IEC JTC1/SC29/WG11), No. n18096, Oct. 31, 2018, XP030193470, 4 Pages.
"NumPy", numpy.org, 2021, pp. 1-3.
Partial International Search Report—PCT/US2021/064869—ISA/EPO—May 18, 2022.
U.S. Appl. No. 17/495,428, filed Oct. 6, 2021, by Cao et al.
Yin H., et al., "3D LiDAR Map Compression for Efficient Localization on Resource Constrained Vehicles", IEEE Transactions on Intelligent Transportation Systems, 2020, pp. 1-16.

\* cited by examiner

GLOBAL MOTION ESTIMATION USING ROAD AND GROUND OBJECT LABELS FOR GEOMETRY-BASED POINT CLOUD COMPRESSION

The present application is a continuation of and claims the benefit of priority to U.S. application Ser. No. 17/558,362, filed Dec. 21, 2021, entitled "GLOBAL MOTION ESTIMATION USING ROAD AND GROUND OBJECT LABELS FOR GEOMETRY-BASED POINT CLOUD COMPRESSION", which claims the benefit of U.S. Provisional Application No. 63/171,945, filed Apr. 7, 2021, entitled "GLOBAL MOTION ESTIMATION USING ROAD AND GROUND OBJECT LABELS FOR GEOMETRY-BASED POINT CLOUD COMPRESSION", and of U.S. Provisional Application No. 63/131,637, filed Dec. 29, 2020, entitled "GLOBAL MOTION ESTIMATION USING ROAD AND GROUND OBJECT LABELS FOR GEOMETRY-BASED POINT CLOUD COMPRESSION", which are assigned to the assignee hereof and incorporated herein by reference in their entirety.

TECHNICAL FIELD

This disclosure relates to point cloud encoding and decoding.

BACKGROUND

A point cloud contains a set of points in a 3D space. Each of the points may have a set of attributes associated with the point. The attributes may be color information, such as R, G, B or Y, Cb, Cr information, or reflectance information, or other attributes. Point clouds may be captured by a variety of cameras or sensors such as LIDAR sensors and 3D scanners. Point clouds may also be computer-generated. Point cloud data may be used in a variety of applications including, but not limited to, construction (modeling), graphics (3D models for visualizing and animation), and the automotive industry (LIDAR sensors used to help in navigation).

A point cloud encoder/decoder (codec) may enclose the 3D space occupied by point cloud data in a virtual bounding box. The position of the points in the bounding box may be represented by a certain precision. Therefore, the point cloud codec may quantize positions of one or more points based on the precision. At the smallest level, the point cloud codec splits the bounding box into voxels, which are the smallest unit of space represented by a unit cube. A voxel in the bounding box may be associated with zero, one, or more than one point. The point cloud codec may split the bounding box into multiple cube/cuboid regions, which may be called tiles. The point cloud codec may code the tiles into one or more slices. The partitioning of the bounding box into slices and tiles may be based on a number of points in each partition, or based on other considerations (e.g., a particular region may be coded as tiles). The slice regions may be further partitioned using splitting decisions similar to those in video codecs.

SUMMARY

In general, this disclosure describes techniques for coding (encoding and decoding) point cloud data. In particular, a G-PCC encoder and/or decoder included as part of one or more processors are configured to determine height values of points in a point cloud. The G-PCC encoder and/or decoder are configured to code a data structure including data that represents a top threshold and a bottom threshold, classify points having height values between the top threshold and the bottom threshold into the set of ground points, and classify points having height values above the top threshold or below the bottom threshold into the set of object points. The G-PCC encoder and/or decoder are configured to code the ground points and the object points according to the classifications. The G-PCC encoder and/or decoder are configured to code a geometry data unit header that includes data that overrides or refines the data of the data structure for the at least one of the top threshold or the bottom threshold.

The details of one or more examples are set forth in the accompanying drawings and the description below. Other features, objects, and advantages will be apparent from the description, drawings, and claims.

DETAILED DESCRIPTION

Point cloud data may be generated by using, for example, a LIDAR system mounted to an automobile. The LIDAR system may emit lasers in multiple different directions in bursts over time as the automobile is moving. Thus, for a given laser emission, a point cloud may be formed. To compress the point cloud data, respective point clouds (frames) may be coded relative to each other, e.g., using intra-frame prediction or inter-frame prediction. This disclosure recognizes that because most objects around the automobile will remain relatively static, points in point clouds corresponding to the objects can be predicted using a common, global motion vector (which may be expected to generally correspond to the direction and offset traversed by the automobile). However, points along the ground may generally remain static between frames, because the lasers may be expected to identify points at the same relative positions within each frame, as the road or ground beneath the automobile is expected to be relatively flat.

Thus, this disclosure describes techniques that may reduce signaling overhead and coding information. In particular, a geometry point cloud compression (G-PCC) encoder and G-PCC decoder may be configured to separately encode and decode object and road/ground points. That is, the G-PCC encoder may be configured to classify points in a point cloud as either object points or ground/road points, then encode the object points using a global motion vector, while encoding the ground/road points separately (e.g., using zero motion vectors, a second, different global motion vector, respective local motion vectors, intra-prediction, or other distinct encoding techniques). Similarly, the G-PCC decoder may separately decode object points from road/ground points. Using a single, global motion vector for all object points in this manner may consume much fewer bits than separately using respective local motion vectors for each of the points in a point cloud. Likewise, coding all road/ground points together may reduce signaling overhead and coding data. These techniques may further reduce the number of processing operations needed to encode and decode point clouds. In this manner, these techniques may improve the operational efficiency of G-PCC encoding and decoding devices, as well as the overall field of geometry-based point cloud compression.

Figure 1:
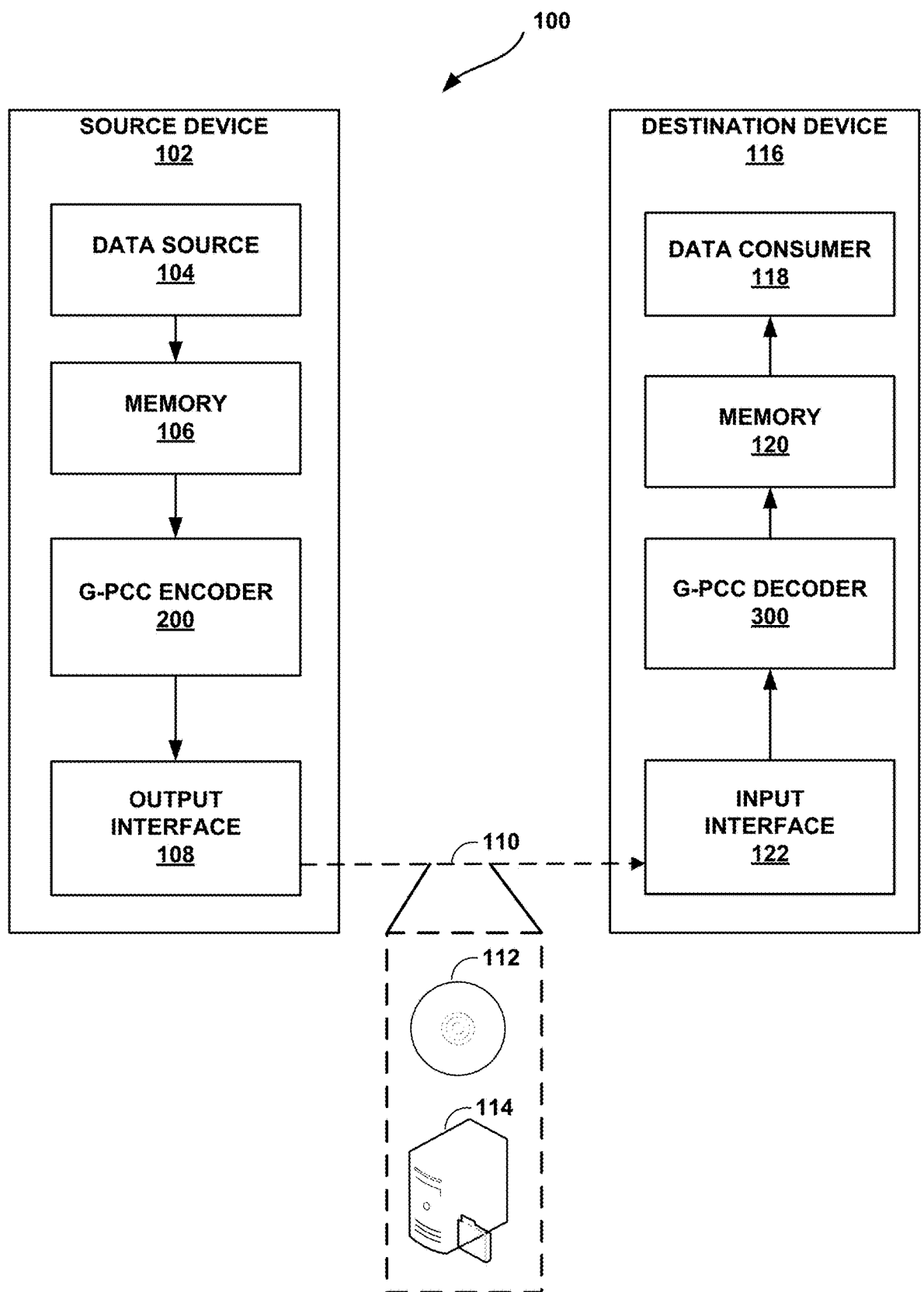
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to labeling points in a point cloud as ground or object points according to height values for the points. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to labeling points in a point cloud as ground or object points according to height values for the points. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A draft of the G-PCC standard is available in G-PCC DIS, ISO/IEC JTC1/SC29/WG11 w19522, MPEG-131, Teleconference, July 2020, and a description of the codec is available in G-PCC Codec Description, ISO/IEC JTC1/SC29/WG11 w19525, MPEG-131, Teleconference, July 2020.

The units shown are logical, and do not necessarily correspond one-to-one to implemented code in the reference implementation of G-PCC codec, i.e., TMC13 test model software studied by ISO/IEC MPEG (JTC 1/SC 29/WG 11). Similarly, the units shown do not necessarily correspond one-to-one to hardware units in a hardware implementation of the G-PCC codec.

In both G-PCC encoder 200 and G-PCC decoder 300, point cloud positions are coded first. Attribute coding depends on the decoded geometry. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail, a finer representation of the point cloud attribute may be obtained. Each level of detail may be specified based on distance metric from the neighboring nodes or based on a sampling distance.

G-PCC encoder 200 may quantize the residuals obtained as the output of the coding methods for the attributes. G-PCC encoder 200 may entropy encode the quantized residuals using context adaptive arithmetic coding.

In accordance with the techniques of this disclosure, G-PCC encoder 200 and G-PCC decoder 300 may be configured to separately encode/decode points of a point cloud based on classifications of the points. In particular, G-PCC encoder 200 and G-PCC decoder 300 may be configured to classify points into, for example, ground (or road) points and object points. In some examples, a LIDAR system mounted on an automobile may project lasers into the surrounding environment to construct a point cloud. This disclosure recognizes that the ground or road on which the automobile is traveling will likely remain relatively flat and stable between frames (i.e., between respective point cloud construction instances). Thus, points collected at the position of the ground or road should be nearly identical between respective frames.

For other parts of the point cloud, identified points may correspond to non-road/ground objects. Thus, the relative positions for each of the points corresponding to non-road/ ground objects may change from frame to frame in substantially the same fashion, due to the velocity of the automobile. As such, it may be efficient to encode and decode points corresponding to objects using global motion vectors and points corresponding to the road or ground using a different mechanism, e.g., a different global motion vector (such as a zero-valued global motion vector), local motion vectors, or intra-prediction.

G-PCC encoder 200 may determine threshold values for classifying points into either ground/road points (generally referred to as "ground" points hereinafter) or object points. For example, G-PCC encoder 200 may determine a top threshold and a bottom threshold, generally representing a top and bottom of the ground or road. Thus, if points are between these two thresholds, the points may be classified as ground points, and other points (e.g., points above the top threshold or below the bottom threshold) may be classified as object points. G-PCC encoder 200 may encode data representing the top and bottom thresholds in a data structure, such as a sequence parameter set (SPS), geometry parameter set (GPS), or geometry data unit header (GDH). G-PCC encoder 200 and G-PCC decoder 300 may therefore encode or decode occupancy of nodes above the top threshold or below the bottom threshold using a global motion vector and nodes between the top and bottom threshold using a second, different global motion vector, local motion vectors, intra-prediction, or other different prediction techniques.

In this manner, the techniques of this disclosure may result in more efficient coding of object points. Rather than coding points in the point cloud using respective local motion vectors, all of the object points between respective clouds may be predicted using a single global motion vector. Thus, signaling overhead related to signaling motion information for the object points may be drastically reduced. Moreover, because it may be largely assumed that ground points will remain constant between frames, the coding techniques for the ground points may consume a relatively low number of bits.

Figure 2:
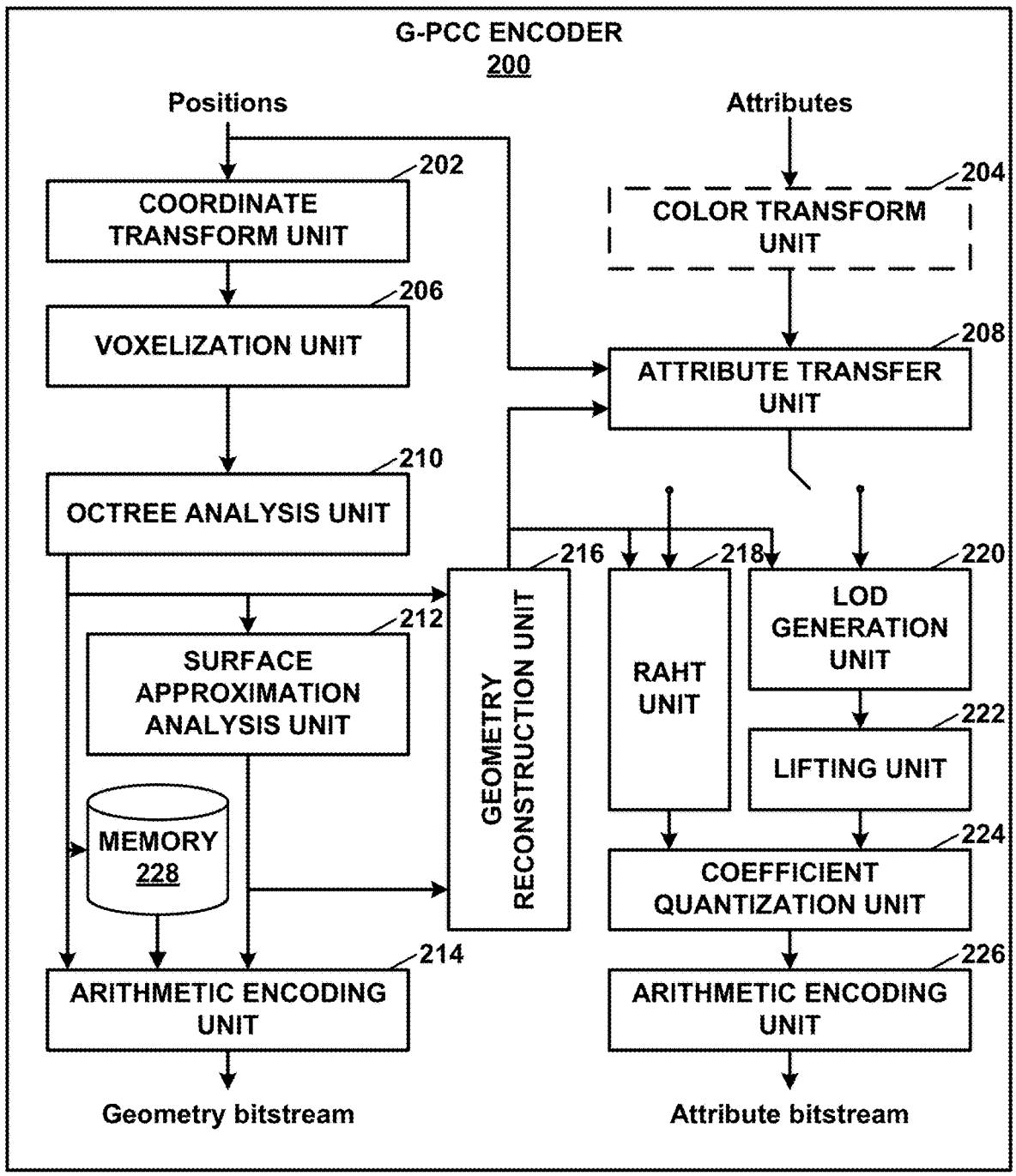
FIG. 2 is a block diagram illustrating an example Geometry Point Cloud Compression (G-PCC) encoder that may be configured to perform the techniques of this disclosure.

FIG. 2 is a block diagram illustrating example components of G-PCC encoder 200 of FIG. 1 that may be configured to perform the techniques of this disclosure. In the example of FIG. 2, G-PCC encoder 200 includes a memory 228, a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226. In FIG. 2, gray-shaded units are options typically used for Category 1 data. In FIG. 2, diagonal-crosshatched units are options typically used for Category 3 data. All the other units are common between Categories 1 and 3.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Octree analysis unit 210 may also store data representing occupied voxels (i.e., voxels occupied by points of the point cloud) in memory 228 (e.g., in a history buffer of memory 228).

Furthermore, arithmetic encoding unit 214 may entropy encode data representing occupancy of the octree. In some examples, arithmetic encoding unit 214 may entropy encode the occupancy data based only on data of a current point cloud (which may be referred to as "intra-prediction" of the current point cloud). In other examples, arithmetic encoding unit 214 may entropy encode the occupancy data with reference to a previous octree for a previous point cloud, e.g., buffered in memory 228 (which may be referred to as "inter-prediction" of the current point cloud, relative to a reference cloud). Arithmetic encoding unit 214 may perform inter-prediction using local or global motion vectors, e.g., as discussed below in greater detail with respect to FIG. 3.

In particular, in accordance with the techniques of this disclosure, arithmetic encoding unit 214 may entropy decode data representing thresholds (e.g., a top threshold and a bottom threshold) for defining ground points (or road points) and object points. The top and bottom thresholds may correspond to a series of frames (point clouds). Arithmetic encoding unit 214 may also entropy decode data representing a global motion vector for a current point cloud of the series of frames. Arithmetic encoding unit 214 may form a predicted cloud using the global motion vector from a previous point cloud buffered in memory 228, and use occupancy of nodes in the predicted cloud to determine context for entropy decoding occupancy data of nodes either above the top threshold or below the bottom threshold of the current cloud. Arithmetic encoding unit 214 may use a different prediction technique for ground/road points, such as a different global motion vector, local motion vectors, intra-prediction, or another alternative entropy decoding/prediction technique.

Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

Figure 3:
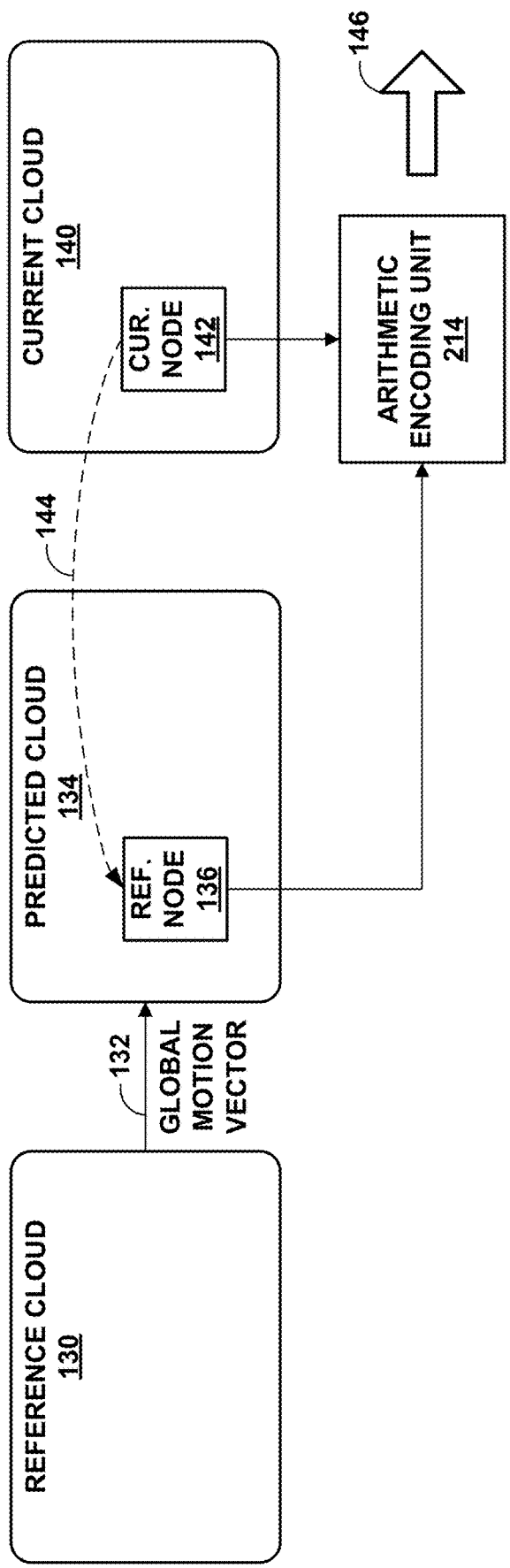
FIG. 3 is a conceptual diagram illustrating an example of inter-prediction encoding in G-PCC.

FIG. 3 is a conceptual diagram illustrating an example of inter-prediction encoding in G-PCC. In some examples, G-PCC encoder 200 may decode/reproduce a point cloud to form reference cloud 130. In other examples, G-PCC encoder 200 may simply store unencoded historical versions of previous point clouds. Reference cloud 130 may be stored in a decoded frame buffer or history buffer (i.e., a memory) of G-PCC encoder 200. G-PCC encoder 200 may further obtain current cloud 140 to be encoded, at least in part, using inter-prediction. For example, G-PCC encoder 200 may use the techniques of this disclosure to determine a set of points of current cloud 140 to be predicted using global motion, as opposed to local motion or intra-prediction.

G-PCC encoder 200 may compare the locations of points of current cloud 140 to be inter-predicted to points of reference cloud 130 and calculate global motion vector 132. Global motion vector 132 may represent a global motion vector that most accurately predicts locations of the points of the current cloud to be inter-predicted using global motion relative to reference cloud 130. G-PCC encoder 200 may then form predicted cloud 134 by applying global motion vector 132 to reference cloud 130. That is, G-PCC encoder 200 may construct predicted cloud 134 by applying global motion vector 132 to each point of reference cloud 130 at respective locations, and setting occupancy of nodes to include a point in predicted cloud 134 at a corresponding location offset by global motion vector 132.

G-PCC encoder 200 (and in particular, arithmetic encoding unit 214) may then encode points of nodes of current cloud 140 using corresponding points within nodes of predicted cloud 134 to determine contexts for context-based entropy encoding, e.g., context adaptive binary arithmetic coding (CABAC). For example, arithmetic encoding unit 214 may encode occupancy of current node 142 of current cloud 140 using occupancy of reference node 136 (which corresponds to the location of current node 142 as indicated by vector 144) to determine context for encoding a value for the occupancy of current node 142.

For example, if reference node 136 is occupied (that is, includes a point), arithmetic encoding unit 214 may determine a first context for encoding a value representing occupancy of current node 142. The first context may indicate a most probable symbol for the value representing occupancy of current node 142 as having a high likelihood of a value representing that current node 142 is occupied (e.g., '1'). On the other hand, if reference node 136 is not occupied (that is, does not include any points), arithmetic encoding unit 214 may determine a second context for encoding the value representing occupancy of current node 142. The second context may indicate a most probable symbol for the value representing occupancy of current node 142 as having a high likelihood of a value representing that current node 142 is not occupied (e.g., '0'). Arithmetic encoding unit 142 may then determine whether current node 142 is actually occupied, determine a value representing whether or not current node 142 is actually occupied, then entropy encode the value using the determined context (e.g., the first context or the second context). Arithmetic encoding unit 214 may add the entropy encoded value to bitstream 146 and proceed to a next node of current cloud 140 (or a next cloud).

Figure 4:
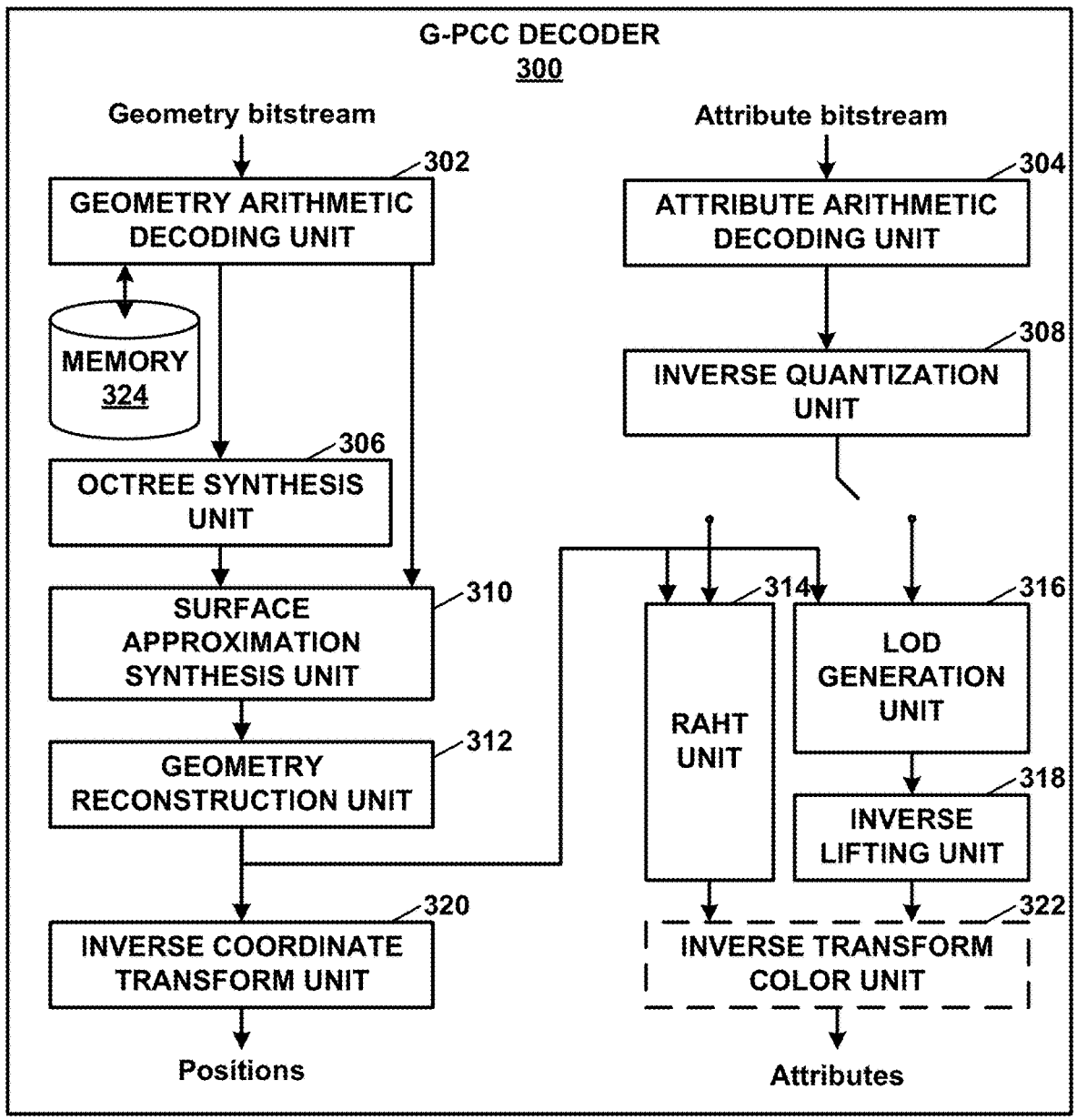
FIG. 4 is a block diagram illustrating an example G-PCC decoder that may be configured to perform the techniques of this disclosure.

FIG. 4 is a block diagram illustrating example components of G-PCC decoder 300 of FIG. 1 that may be configured to perform the techniques of this disclosure. In the example of FIG. 4, G-PCC decoder 300 includes a geometry arithmetic decoding unit 302, a memory 324, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322. In FIG. 4, gray-shaded units are options typically used for Category 1 data. In FIG. 4, diagonal-crosshatched units are options typically used for Category 3 data. All the other units are common between Categories 1 and 3.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Geometry arithmetic decoding unit 302 may entropy decode data representing occupancy of an octree for a current point cloud. In some examples, geometry arithmetic decoding unit 302 may entropy decode the occupancy data based only on data of a current point cloud (which may be referred to as "intra-prediction" of the current point cloud). In other examples, geometry arithmetic decoding unit 302 may entropy decode the occupancy data with reference to a previous octree for a previous point cloud, e.g., buffered in memory 324 (which may be referred to as "inter-prediction" of the current point cloud, relative to a reference cloud). Geometry arithmetic decoding unit 302 may perform inter-prediction using local or global motion vectors, e.g., as discussed below in greater detail with respect to FIG. 5.

In particular, in accordance with the techniques of this disclosure, geometry arithmetic decoding unit 302 may entropy decode data representing thresholds (e.g., a top threshold and a bottom threshold) for defining ground points (or road points) and object points. The top and bottom thresholds may correspond to a series of frames (point clouds). Geometry arithmetic decoding unit 302 may also entropy decode data representing a global motion vector for a current point cloud of the series of frames. Geometry arithmetic decoding unit 302 may form a predicted cloud using the global motion vector from a previous point cloud buffered in memory 324, and use occupancy of nodes in the predicted cloud to determine context for entropy decoding occupancy data of nodes either above the top threshold or below the bottom threshold of the current cloud. Geometry arithmetic decoding unit 302 may use a different prediction technique for ground/road points, such as a different global motion vector, local motion vectors, intra-prediction, or another alternative entropy decoding/prediction technique.

Octree synthesis unit 306 may synthesize an octree based on data for syntax elements parsed from the geometry bitstream and entropy decoded by geometry arithmetic decoding unit 302. In instances where surface approximation is used in the geometry bitstream, surface approximation synthesis unit 310 may determine a surface model based on syntax elements parsed from the geometry bitstream and based on the octrec.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 4, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 4, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 4 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
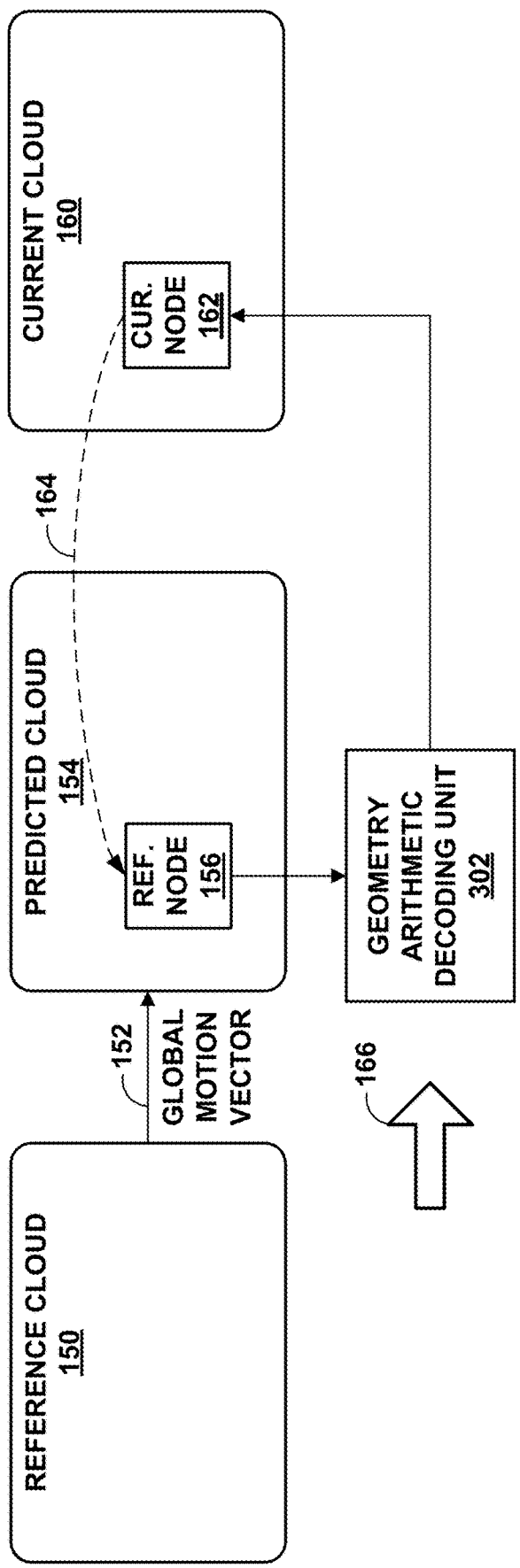
FIG. 5 is a conceptual diagram illustrating an example of inter-prediction decoding in G-PCC.

FIG. 5 is a conceptual diagram illustrating an example of inter-prediction decoding in G-PCC. In accordance with the techniques of this disclosure, G-PCC decoder 300 may use the global motion vector inter-prediction techniques of FIG. 5 to decode a set of points of current cloud 160, and local motion vector inter-prediction or intra-prediction to decode a second set of points of current cloud 160. G-PCC decoder 300 may receive and decode data of bitstream 166 representing whether sets of points for one or more nodes are to be decoded using global motion vector inter-prediction.

G-PCC decoder 300 may initially decode one or more previous point clouds and store the previously decoded point clouds in a decoded frame buffer or history buffer (i.e., a memory of G-PCC decoder 300). G-PCC decoder 300 may also decode motion information including data for global motion vector 152 and identifying reference cloud 150 in the previously decoded point clouds.

G-PCC decoder 300 may apply global motion vector 152 to reference cloud 150 to generate predicted cloud 154. That is, G-PCC decoder 300 may construct predicted cloud 154 by applying global motion vector 152 to each point of reference cloud 150 at respective locations, and setting occupancy of nodes (e.g., reference node 156) of predicted cloud 154 to include a point at a corresponding location offset by global motion vector 152.

Geometry arithmetic decoding unit 302 may then use the occupancy of nodes of predicted cloud 154 (e.g., reference node 156) to determine a context for decoding a value representing occupancy of current node 162 of current cloud 160. Current cloud 162 corresponds to reference node 156 as indicated by vector 164. For example, if reference node 156 is occupied (that is, includes a point), geometry arithmetic decoding unit 302 may determine a first context for encoding a value representing occupancy of current node 162. The first context may indicate a most probable symbol for the value representing occupancy of current node 162 as having a high likelihood of a value representing that current node 162 is occupied (e.g., '1'). On the other hand, if reference node 156 is not occupied (that is, does not include any points), geometry arithmetic decoding unit 302 may determine a second context for encoding the value representing occupancy of current node 162. The second context may indicate a most probable symbol for the value representing occupancy of current node 162 as having a high likelihood of a value representing that current node 162 is not occupied (e.g., '0'). Geometry arithmetic decoding unit 302 may then decode a value of bitstream 166 representing occupancy of current node 162 using the determined context.

Figure 6:
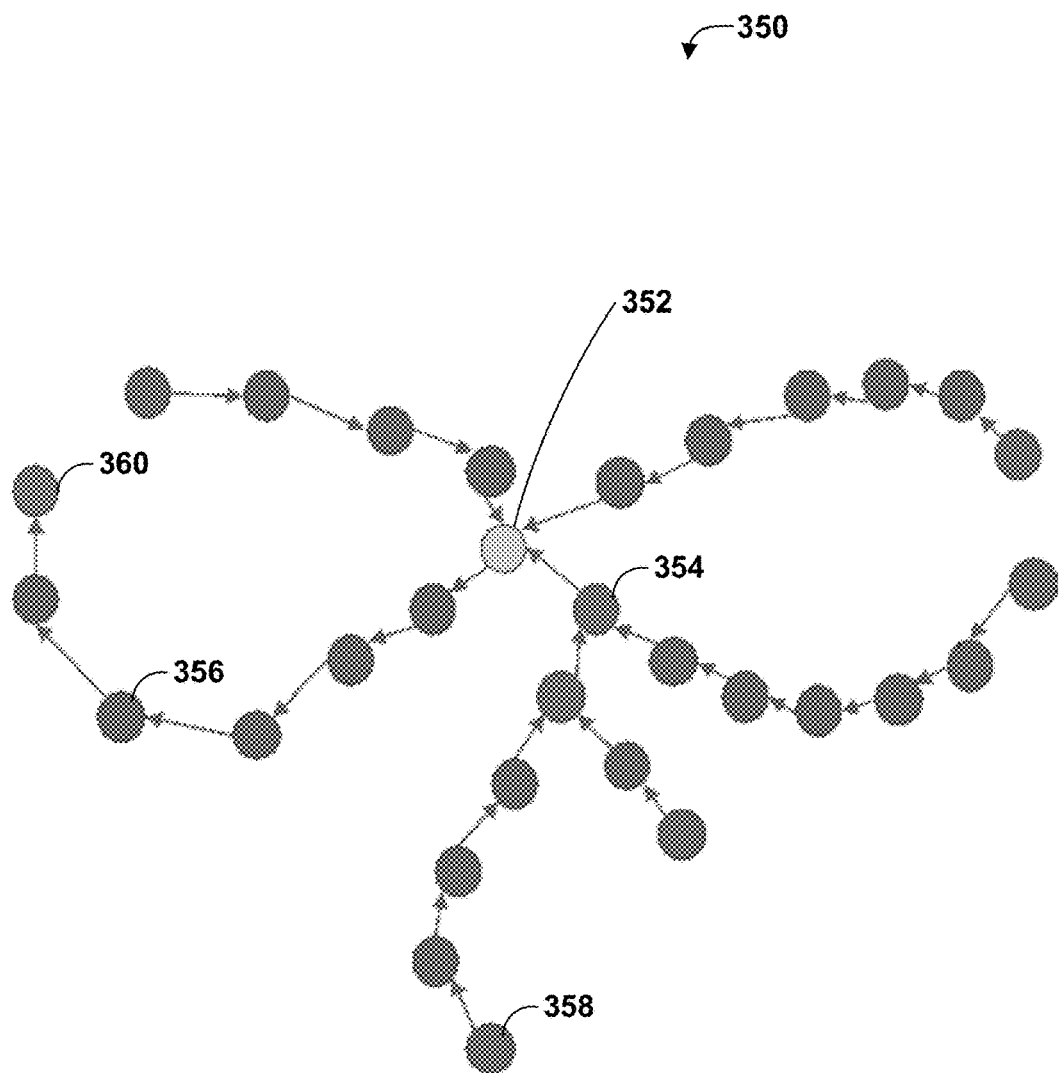
FIG. 6 is a conceptual diagram illustrating an example prediction tree that may be used when performing the techniques of this disclosure.

FIG. 6 is a conceptual diagram illustrating an example prediction tree that may be used when performing the techniques of this disclosure. Predictive geometry coding was introduced in "Exploratory model for inter-prediction in G-PCC," ISO/IEC JTC1/SC29 WG11, Document N18096, Macau, CN, October 2018, as an alternative to octrec geometry coding. In predictive geometry coding, nodes are arranged in a tree structure (which defines the prediction structure), and various prediction strategies are used to predict the coordinates of each node in the tree with respect to its predictors.

FIG. 6 illustrates an example prediction tree 350, which is a directed graph where the arrows point in the prediction direction. Prediction tree 350 includes various types of nodes according to a number of children (e.g., 0 to 3). In the example of FIG. 6, node 352 is an example of a branch vertex with three children, node 354 is an example of a branch node with two children, node 356 is an example of a branch node with one child, node 358 represents an example of a leaf vertex, and node 360 represents an example of a root vertex. As the root vertex, node 360 has no predictors. Every node in prediction tree 350 has at most one parent node.

Four prediction strategies may be specified for a current node based on its parent (p0), grand-parent (p1) and great-grand-parent (p2): 1) no prediction/zero prediction (0); 2) delta prediction (p0); 3) linear prediction (2*p0−p1); parallelogram prediction (2*p0+p1−p2).

G-PCC encoder 200 may employ any algorithm to generate the prediction tree. G-PCC encoder 200 may determine the algorithm to be used according to the application/use case, and several strategies may be used. Some strategies are described in N18096.

For each node, G-PCC encoder 200 may encode residual coordinate values in the bitstream starting from the root node in a depth-first manner. Predictive geometry coding may be particularly useful for Category 3 (e.g., LIDAR-acquired) point cloud data, e.g., for low-latency applications.

Figure 7:
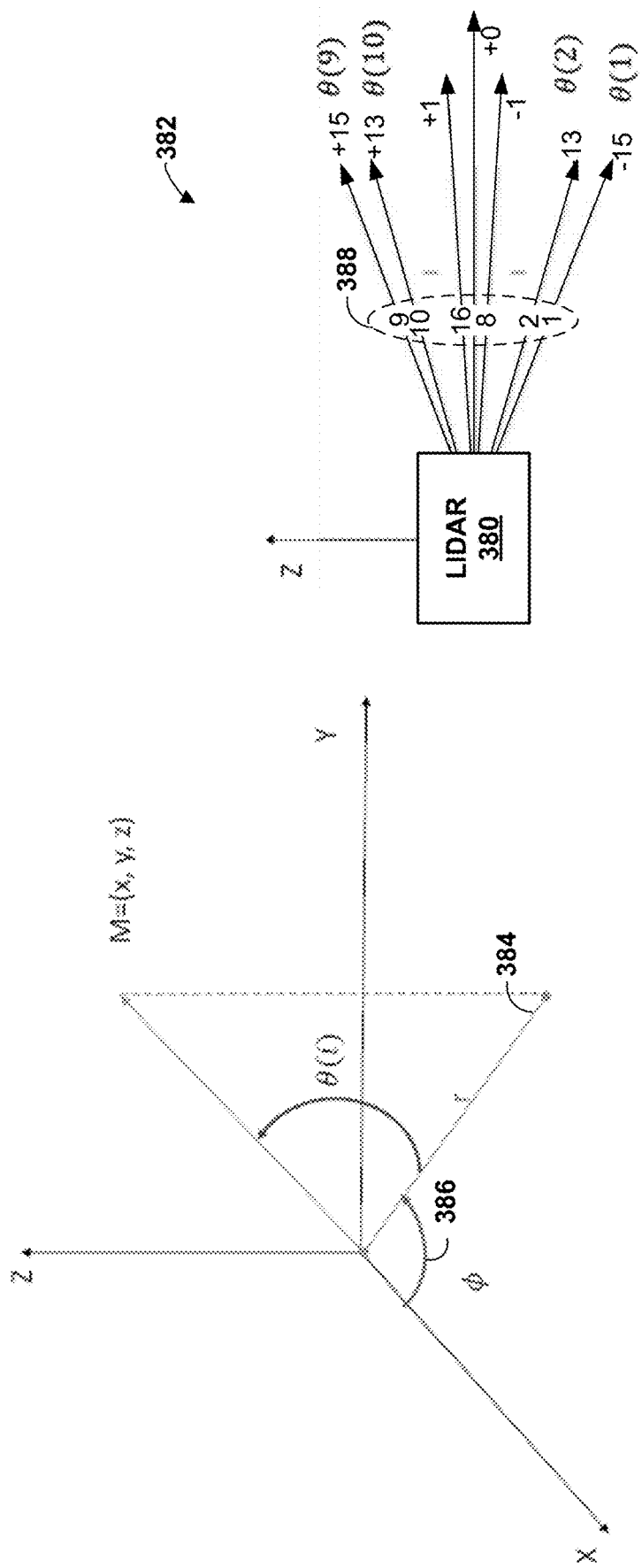
FIG. 7 is a conceptual diagram illustrating an example spinning LIDAR acquisition model.

FIG. 7 is a conceptual diagram illustrating an example spinning LIDAR acquisition model. FIG. 7 illustrates LIDAR 380, which includes a number of sensors that emit and receive respective lasers 382. G-PCC includes an angular mode for predictive geometry coding. In angular mode, characteristics of LIDAR sensors may be used to code the prediction tree more efficiently. In angular mode, coordinates of positions are converted to radius (r) 384, azimuth ($\phi$) 386, and laser index (i) 388 values. G-PCC encoder 200 and G-PCC decoder 300 may perform prediction in this domain. That is, G-PCC encoder 200 and G-PCC decoder 300 may code residual values in the in r, $\phi$, i domain.

Due to errors in rounding, coding in r, o, i domain is not lossless. Therefore, G-PCC encoder 200 and G-PCC decoder 300 may code a second set of residuals that correspond to Cartesian coordinates. A description of the encoding and decoding strategies used for angular mode for predictive geometry coding is reproduced below from N18096.

Angular mode for predictive geometry coding focuses on point clouds acquired using a spinning Lidar model. In the example of FIG. 7, LIDAR 380 has N lasers 382 (e.g., where N may be equal to 16, 32, 64, or some other value) spinning around the Z axis according to an azimuth angle $\phi$. Each of lasers 382 may have a different elevation angle $\theta(i)_{i=1 \ldots N}$ and height $\zeta(i)_{i=1 \ldots N}$. Suppose that laser i hits a point M, with cartesian integer coordinates (x, y, z), defined according to a coordinate system.

According to N18096, the position of point M may be modelled with the three parameters (r, $\phi$, i), which may be computed as follows:

$$r = \sqrt{x^2 + y^2}$$
$$\phi = a\tan2(y, x)$$
$$i = \arg\min_{j=1 \ldots N}\{z + \varsigma(j) - r \times \tan(\theta(j))\},$$

More precisely, G-PCC encoder 200 and G-PCC decoder 300 may use the quantized versions of (r, $\phi$, i), denoted ($\tilde{r}$, $\tilde{\phi}$, i), where the three integers $\tilde{r}$, $\tilde{\phi}$ and i may be computed as follows:

$$\tilde{r} = \text{floor}\left(\frac{\sqrt{x^2 + y^2}}{q_r} + o_r\right) = hypot(x, y)$$
$$\tilde{\phi} = \text{sign}(a\tan2(y, x)) \times \text{floor}\left(\frac{|a\tan2(y, x)|}{q_\phi} + o_\phi\right)$$
$$i = \arg\min_{j=1 \ldots N}\{z + \varsigma(j) - r \times \tan(\theta(j))\}$$

where
($q_r$, $o_r$) and ($q_\phi$, $o_\phi$) are quantization parameters controlling the precision of $\tilde{\phi}$ and $\tilde{r}$, respectively.
sign(t) is the function that return 1 if t is positive and (−1) otherwise.
|t| is the absolute value of t.

To avoid reconstruction mismatches due to the use of floating-point operations, G-PCC encoder 200 and G-PCC decoder 300 may pre-compute and quantize values of $\zeta(i)_{i=1 \ldots N}$ and $\tan(\theta(i))_{i=1 \ldots N}$ as follows:

$$\tilde{z}(i) = \text{sign}(\varsigma(i)) \times \text{floor}\left(\frac{|\varsigma(i)|}{q_\varsigma} + o_\varsigma\right)$$
$$\tilde{t}(i) = \text{sign}\left(\varsigma(\tan(\theta(j)))\right) \times \text{floor}\left(\frac{|\tan(\theta(j))|}{q_\theta} + o_\theta\right)$$

where
($q_\varsigma$, $o_\varsigma$) and ($q_\theta$, $o_\theta$) are quantization parameters controlling the precision of $\tilde{\zeta}$ and $\tilde{\theta}$, respectively.

G-PCC encoder 200 and G-PCC decoder 300 may obtain the reconstructed cartesian coordinates as follows:

$$\hat{x} = \text{round}(\tilde{r} \times q_r \times app\_cos(\tilde{\phi} \times q_\phi))$$
$$\hat{y} = \text{round}(\tilde{r} \times q_r \times app\_sin(\tilde{\phi} \times q_\phi))$$
$$\hat{z} = \text{round}(\tilde{r} \times q_r \times \tilde{t}(i) \times q_\theta - \tilde{z}(i) \times q_\varsigma),$$

where app_cos(.) and app_sin(.) are approximations of cos (.) and sin(.), respectively. The calculations could use a fixed-point representation, a look-up table, and/or linear interpolation.

For various reasons, such as quantization, approximations, model imprecision, and/or model parameters imprecisions, ($\hat{x}$, $\hat{y}$, $\hat{z}$) may be different from (x, y, z).

Let ($r_x$, $r_y$, $r_z$) be the reconstruction residuals defined as follows:

$$r_x = x - \hat{x}$$
$$r_y = y - \hat{y}$$
$$r_z = z - \hat{z}$$

G-PCC encoder 200 may proceed as follows:
· Encode the model parameters $\tilde{t}(i)$ and $\tilde{z}(i)$ and the quantization parameters $q_r$, $q_\varsigma$, $q_\theta$ and $q_\phi$.
Apply the geometry predictive scheme described in w19522 to the representation ($\tilde{r}$, $\tilde{\phi}$, i):
A new predictor leveraging the characteristics of lidar could be introduced. For instance, the rotation speed of the lidar scanner around the z-axis is usually constant. Therefore, G-PCC encoder 200 may predict the current $\tilde{\phi}(j)$ as follows:

$$\tilde{\phi}(j) = \tilde{\phi}(j-1) + n(j) \times \delta_\phi(k),$$

where
$(\delta_\phi(k))_{k=1 \ldots K}$ is a set of potential speeds the encoder could choose from. G-PCC encoder 200 may explicitly encode index k to the bitstream, or G-PCC decoder 300 could infer index k from context based on a deterministic strategy applied by both G-PCC encoder 200 and G-PCC decoder 300, and
n(j) is the number of skipped points which G-PCC encoder could explicitly encode to the bitstream, or G-PCC decoder 300 could infer n(j) from context based on a deterministic strategy applied by both G-PCC encoder 200 and G-PCC decoder 300. n(j) is also referred to as the "phi multiplier." n(j) may be used with a delta predictor.

Encode with each node the reconstruction residuals ($r_x$, $r_y$, $r_z$)

G-PCC decoder 300 may proceed as follows:

Decode the model parameters t̃(i) and z̃(i) and the quantization parameters $q_r$, $q_z$, $q_\theta$ and $q_\phi$.

Decode the (r̃, ϕ̃, i) parameters associated with the nodes according to the geometry predictive scheme described in w19522.

Compute the reconstructed coordinates (x̂, ŷ, ẑ) as described above.

Decode the residuals ($r_x$, $r_y$, $r_z$).

Lossy compression could be supported by quantizing the reconstruction residuals ($r_x$, $r_y$, $r_z$).

Compute the original coordinates (x, y, z) as follows:

$$x = r_x + \hat{x}$$
$$y = r_y + \hat{y}$$
$$z = r_z + \hat{z}$$

Lossy compression may be achieved if G-PCC encoder 200 applies quantization to the reconstruction residuals ($r_x$, $r_y$, $r_z$) or drops points. Quantized reconstruction residuals may be computed as follows:

$$\tilde{r}_x = \text{sign}(r_x) \times \text{floor}\left(\frac{|r_x|}{q_x} + o_x\right)$$
$$\tilde{r}_y = \text{sign}(r_y) \times \text{floor}\left(\frac{|r_y|}{q_y} + o_y\right)$$
$$\tilde{r}_z = \text{sign}(r_z) \times \text{floor}\left(\frac{|r_z|}{q_z} + o_z\right),$$

where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

Trellis quantization could be used to further improve the RD (rate-distortion) performance results. The quantization parameters may change at sequence/frame/slice/block level to achieve region adaptive quality and for rate control purposes.

Figure 8:
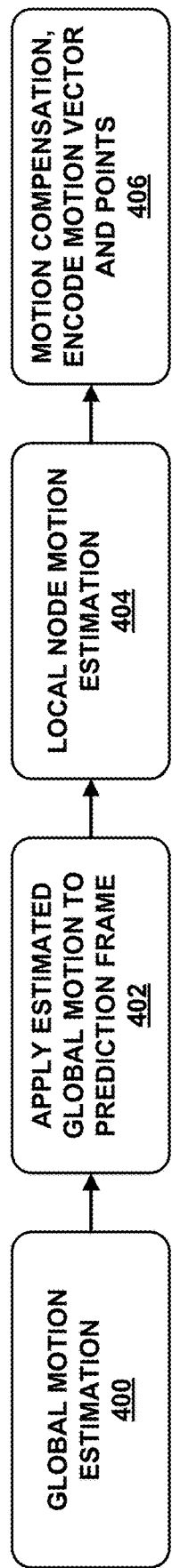
FIG. 8 is a flowchart illustrating an example motion estimation process for G-PCC InterEM software.

FIG. 8 is a flowchart illustrating an example motion estimation process for G-PCC InterEM software. There are two kinds of motion involved in G-PCC InterEM software, a global motion matrix and a local node motion vector. Global motion parameters are defined as a rotation matrix and translation vector, which will be applied on all the points in a prediction (reference) frame. A local node motion vector of a node of the octree is a motion vector that may only be applied on points within the node in a prediction (reference) frame. Details of the motion estimation algorithm in InterEM are described below. FIG. 8 illustrates flowchart for a motion estimation algorithm.

Given input prediction (reference) frame and current frame, G-PCC encoder 200 may first estimate global motion at a global scale (400). G-PCC encoder 200 may then apply estimated global motion to the prediction (reference) frame (402). After applying global motion on the prediction (reference) frame, G-PCC encoder 200 may estimate local motion at a finer scale (404), e.g., node level in octrec. Finally, G-PCC encoder 200 may perform motion compensation (406) to encode the estimated local node motion vectors and points.

Figure 9:
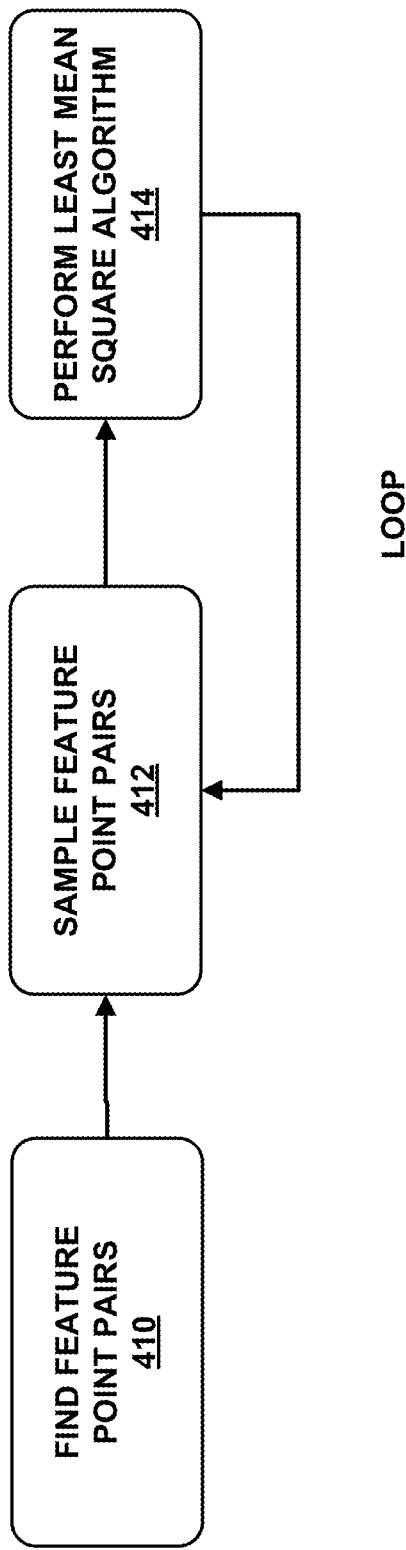
FIG. 9 is a flowchart illustrating an example process for estimating global motion.

FIG. 9 is a flowchart illustrating an example process for estimating global motion. In the InterEM software, the global motion matrix is defined to match feature points between the prediction frame (reference) and the current frame. FIG. 9 illustrates the pipeline for estimating global motion. The global motion estimation algorithm may be divided into three steps: finding feature points (410), sampling feature points pairs (412), and motion estimation using a Least Mean Square (LMS) algorithm (414).

The algorithm defines feature points to be those points that have large position change between the prediction frame and current frame. For each point in the current frame, G-PCC encoder 200 finds the closest point in the prediction frame and builds point pairs between the current frame and the prediction frame. If the distance between the paired points is greater than a threshold, G-PCC encoder 200 regards the paired points as feature points.

After finding the feature points, G-PCC encoder 200 performs a sampling on the feature points to reduce the scale of the problem (e.g., by choosing a subset of feature points to reduce the complexity of motion estimation). Then, G-PCC encoder 200 applies the LMS algorithm to derive motion parameters by attempting to reduce the error between respective features points in the prediction frame and the current frame.

Figure 10:
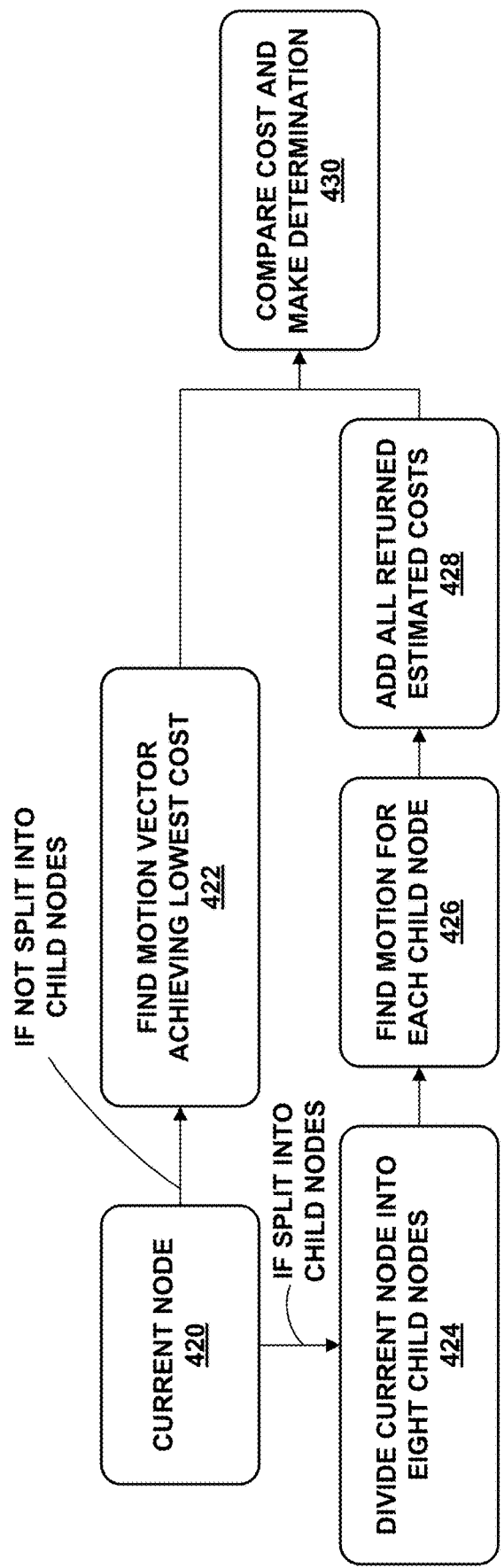
FIG. 10 is a flowchart illustrating an example process for estimating a local node motion vector.

FIG. 10 is a flowchart illustrating an example process for estimating a local node motion vector. G-PCC encoder 200 may estimate the motion vectors for nodes of the prediction tree in a recursive manner. G-PCC encoder 200 may evaluate a cost function for selecting a best suitable motion vector based on rate-distortion (RD) costs.

In the example of FIG. 10, G-PCC encoder 200 receives a current node (420). If the current node is not split into 8 children, G-PCC encoder 200 determines a motion vector that would result in the lowest cost between the current node and the prediction node (422). On the other hand, if the current node is divided into 8 children, G-PCC encoder 200 divides the current node into 8 children (424), finds motion for each of the child nodes (426), and adds all returned estimated costs (428). That is, G-PCC encoder 200 applies a motion estimation algorithm and obtains a total cost under a split condition by adding the estimated cost value of each child node. G-PCC encoder 200 may determine whether to split or not split a node by comparing costs between splitting and not splitting. If split, G-PCC encoder 200 may assign each sub-node its respective motion vector (or further split the node into respective child nodes). If not split, G-PCC encoder 200 may assign the node its motion vector. G-PCC encoder 200 may then compare the costs to determine whether to split the current node or not split the current node (430).

Two parameters that may affect the performance of motion vector estimation are block size (BlockSize) and minimum prediction unit size (MinPUSize). BlockSize defines the upper bound of node size to apply motion vector estimation and MinPUSize defines the lower bound.

U.S. Provisional Patent No. 63/090,657, filed Oct. 12, 2020, converted as U.S. patent application Ser. No. 17/495,428, filed Oct. 2021, described an improved global motion estimation technique based on Iterative Closest Point scheme. In this scheme, first, an initial translation vector is estimated by minimizing the mean squared error between the current frame and the reference frame. When estimating the initial translation vector, labels for whether a point is ground or not could be taken into consideration. For example, if a point is a ground point, then this point is excluded from the estimation. The initial translation vector combined with identity matrix may then be fed into the Iterative Closest Point scheme or a similar scheme to estimate the rotation matrix and the translation vector. Also, in this case, whether a point is ground or not could be taken into consideration, for example, by excluding it from the estimation. Alternatively, the rotation matrix may be estimated first, based on labels for whether a point is ground or not. The label may be derived by G-PCC encoder 200 and signaled to G-PCC decoder 300, or G-PCC encoder 200 and G-PCC decoder 300 may derive the label. The label may be derived based on ground estimation algorithms; such algorithms could be based on the height of a point, density of the point cloud in the neighborhood of the point, relative distance of the point from the LIDAR origin/fixed points, etc.

In real applications, such as automotive, the ground area and the objects in a point cloud typically have different motions. For example, the ground points may have zero motion or small motion, while the objects may have higher motion. In the traditional method to estimate global motion in InterEM software, both ground points and object points may be used to derive the global motion. After doing so, the output of the estimation may not be accurate.

U.S. Provisional Patent No. 63/090,657, filed Oct. 12, 2020, introduced several labeling methods to classify objects and ground. For example, in these methods, G-PCC encoder 200 may derive the label and signal the label to G-PCC decoder 300, or both G-PCC encoder 200 and G-PCC decoder 300 may derive the label. The label may be derived based on a ground estimation algorithm; such algorithms could be based on the height of a point, density of the point cloud in the neighborhood of the point, relative distance of the point from the LIDAR origin/fixed points, etc.

This disclosure describes techniques for labeling ground and objects to improve the performance of global motion estimation. In particular, G-PCC encoder 200 and G-PCC decoder 300 may be configured to classify ground/road and object data in a point cloud, which may improve the performance of global motion estimation.

Figure 11:
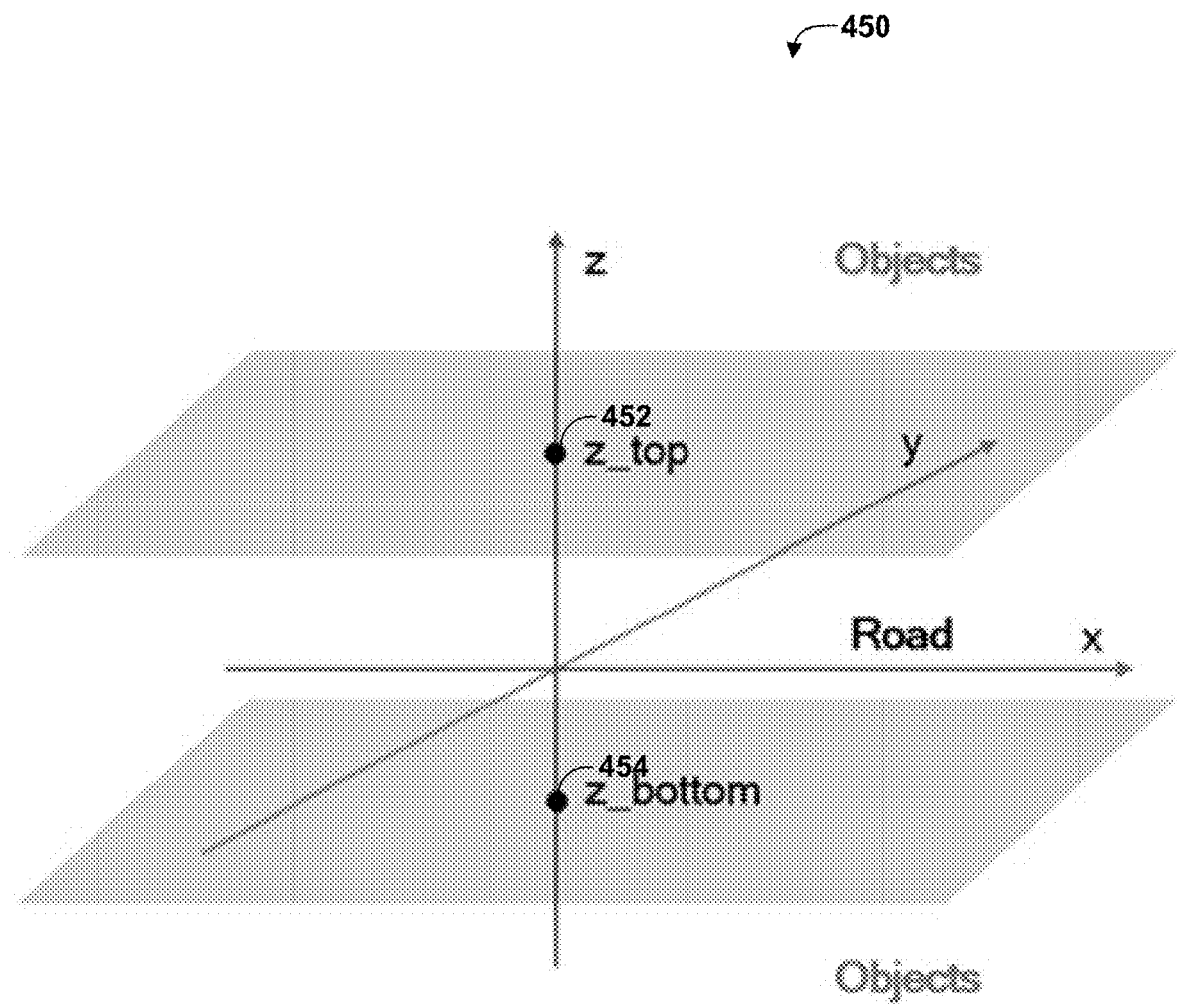
FIG. 11 is a graph illustrating an example classification of a cloud into ground (road) and objects using two thresholds of z-values of points according to the techniques of this disclosure.

FIG. 11 is a graph illustrating an example classification of a cloud into ground (road) and objects using two thresholds of z-values of points according to the techniques of this disclosure. G-PCC encoder 200 and G-PCC decoder 300 may be configured to classify ground and road points using the height (or z-value) of points in the cloud. In an example, G-PCC encoder 200 and G-PCC decoder 300 may be configured with definitions for two thresholds, e.g., z_top 452 and z_bottom 454 as shown in FIG. 11.

If the height (z-value) of a point is lower than z_bottom 454 or higher than z_top 452, G-PCC encoder 200 and G-PCC decoder 300 may classify the point as an object. Otherwise, if the point has a height (z-value) between z_bottom 454 and z_top 452, G-PCC encoder 200 and G-PCC decoder 300 may classify the point as ground (road).

In some examples, G-PCC encoder 200 and G-PCC decoder 300 may specify ground points using a set of value ranges and classify the ground points as including any point that satisfies at least one of the value ranges. For example, for an (x, y, z) coordinate, G-PCC encoder 200 and G-PCC decoder 300 may be configured with a specification of an $i^{th}$ value range as $\{(x\_min_i, x\_max_i), (y\_min_i, y\_max_i), (z\_min_i, z\_max_i)\}$. G-PCC encoder 200 and G-PCC decoder 300 may be configured with N such ranges, such that i is in [1, N]. G-PCC encoder 200 and G-PCC decoder 300 may classify a point at (x, y, 2) as a ground point if $((x\_min_i \le x \le x\_max_i)$ & $(y\_min_i \le y \le y\_max_i)$ & $(z\_min_i \le z \le z\_max_i))$ for some value of i in [1, N] (or alternatively, i in [0, N−1]).

G-PCC encoder 200 and G-PCC decoder 300 may be configured with min values down to negative infinity and max values up to infinity. In the example above regarding z-values for points between z_bottom 454 and z_top 452 being classified as ground and other points being classified as objects, $x\_min_i$ and $y\_min_i$ may be set to negative infinity, and $x\_max_i$ and $y\_max_i$ may be set to infinity, while $z\_min_i$ may be set to z_bottom 454 and $z\_max_i$ may be set to z_top 452.

When G-PCC encoder 200 is configured to quantize the point cloud before encoding by a scaling factor, G-PCC encoder 200 and G-PCC decoder 300 may also quantize the threshold values using the same quantization factor.

In addition or in the alternative, G-PCC encoder 200 and G-PCC decoder 300 may be configured to use the output of the classification of points (e.g., into road and ground points) in global motion estimation and prediction. G-PCC encoder 200 and G-PCC decoder 300 may estimate global motion according to the techniques of the InterEM software or the method described in U.S. Provisional Application No. 63/090,657 as discussed above.

Alternatively, in some examples, G-PCC encoder 200 and G-PCC decoder 300 may derive two global motion sets. G-PCC encoder 200 and G-PCC decoder 300 may use the first set of global motion information to predict ground/road points and the second set to predict object points. To derive the global motion set for ground/road, only the points with the label of "ground/road" may be used. To derive the global motion set for objects, only the points with the label "object" may be used.

As yet another example, G-PCC encoder 200 and G-PCC decoder 300 may only derive one global motion set to predict object points. In this example, G-PCC encoder 200 and G-PCC decoder 300 may predict ground/road points using zero motion (translation and rotation set equal to zero).

In some examples, which may be used in addition to the various techniques discussed above, G-PCC encoder 200 and G-PCC decoder 300 may define a threshold for different levels of sharing. For example, G-PCC encoder 200 and G-PCC decoder 300 may determine a threshold independently for different frames. G-PCC encoder 200 may determine thresholds of each frame and encode data representing the thresholds in the bitstream, such that G-PCC decoder 300 can determine the thresholds from the encoded data of the bitstream.

In some examples, G-PCC encoder 200 and G-PCC decoder 300 may define the thresholds at the level of a group of pictures (GOP). In this example, all frames in the GOP may share the same thresholds. G-PCC encoder 200 and G-PCC decoder 300 may determine the shared thresholds at the beginning of the GOP and code data jointly with encoding information of an ordinal first frame of the GOP.

In some examples, G-PCC encoder 200 and G-PCC decoder 300 may define thresholds at the sequence level. That is, all frames in the sequence may share the same thresholds. In this example, the thresholds may be presented in an encoder configuration data (e.g., an encoder configuration file) for G-PCC encoder 200, and G-PCC encoder 200 may encode data representing the thresholds in the bitstream such that G-PCC decoder 300 can determine the thresholds from the encoded data.

G-PCC encoder 200 may derive the threshold that applies to a set (e.g., GOP, sequence, etc.) of two or more frames using various techniques:

In the simplest case, G-PCC encoder 200 may select the threshold of the ordinal first frame in the set as the threshold for frames in the set. The ordinal first frame may be the ordinal first frame in the output order or the decoding order of the point cloud.

In some examples, G-PCC encoder 200 may derive the threshold used according to a weighted average of thresholds derived for/applicable to two more frames in the set. For example, if there are 10 frames in the set, and $t1_i$, $t2_i$ refers to the thresholds derived for the i-th frame, the final threshold may be derived as follows for n equal to 1 and 2:

$$tn_f = \sum_{i=1}^{10} w_i tn_i$$

An example of the weights may be set uniformly for all the frames in the set. The weights may also be specified such that only some of the frames are used for calculating the final threshold; e.g., every 8-th frame may be chosen to have a non-zero weight, and all other frames may be given a 0 weight. The weights may also be specified based on a temporal ID of the point cloud; frames that belong to lower temporal ID may get a larger weight, and frames that belong to higher temporal ID may get a smaller weight.

In some alternatives, G-PCC encoder 200 may be configured with constraints on the sum of the weights used to derive a threshold being equal to 1.

In some examples, G-PCC encoder 200 may derive the thresholds and encode data in the bitstream such that G-PCC decoder 300 can determine the thresholds from the encoded data. In some examples, both G-PCC encoder 200 and G-PCC decoder 300 may derive the thresholds according to the same techniques.

In some examples, when G-PCC encoder 200 signals the thresholds, G-PCC encoder 200 may signal the thresholds in a sequence parameter set (SPS), a geometry parameter set (GPS), or in a geometry data unit header (GDH). In one example, where G-PCC encoder 200 signals the thresholds in the GPS/GDH level, G-PCC encoder 200 may be configured to conditionally signal the thresholds, e.g., only when angular mode is enabled. Thus, when angular mode is enabled, G-PCC encoder 200 and G-PCC decoder 300 may be configured to code the data for the thresholds in the GPS/GDH, whereas when angular mode is disabled, G-PCC encoder 200 and G-PCC decoder 300 may be configured to avoid coding the data from the thresholds. Alternatively, G-PCC encoder 200 and G-PCC decoder 300 may be configured to code the data for the thresholds unconditionally.

G-PCC encoder 200 and G-PCC decoder 300 may code data for the thresholds as se(v) or ue(v) values. Se(v) coding may represent a signed integer $0^{th}$ order Exp-Golomb-coded syntax element with the left bit first, while ue(v) coding may represent an unsigned integer $0^{th}$ order Exp-Golomb-coded syntax element with the left bit first. In one example, the GPS may be modified as follows in Table 1, where [added: "added text"] represents additions to the existing G-PCC standard, and according to which G-PCC encoder 200 and G-PCC decoder 300 may be configured:

TABLE 1

| geometry_angular_enabled_flag | u(1) |
|---|---|
| if( geometry_angular_enabled_flag ){ | |
|     [added: "geom_globmotion_threshold0 | se(v)"] |
|     [added: "geom_globmotion_threshold1 | se(v)"] |

TABLE 1-continued

| geom_slice_angular_origin_present_flag | u(1) |
|---|---|
| if( !geom_slice_angular_origin_present_flag ) { | |
|   geom_angular_origin_bits_minus1 | ue(v) |
|   for( k = 0; k < 3; k++ ) | |
|     geom_angular_origin_xyz[ k ] | s(v) |
| } | |
| if( geom_tree_type == 1 ) { | |
|   geom_angular_azimuth_scale_log2 | ue(v) |
|   geom_angular_azimuth_step_minus1 | ue(v) |
|   geom_angular_radius_scale_log2 | ue(v) |
| } | |
| number_lasers_minus1 | ue(v) |
| laser_angle_init | se(v) |
| laser_correction_init | se(v) |
| if( geom_tree_type == 0 ) | |
|   laser_phi_per_turn_init_minus1 | ue(v) |
| for( i = 1; i <= number_lasers_minus1; i++ ) { | |
|   laser_angle_diff[ i ] | se(v) |
|   laser_correction_diff[ i ] | se(v) |
|   if( geom_tree_type == 0 ) | |
|     laser_phi_per_turn_diff [ i ] | se(v) |
| } | |
| if( geometry_planar_enabled_flag ) | |
|   planar_buffer_disabled_flag | u(1) |
| } | |

Alternatively, if the threshold values are large enough, a fixed-length coding can also be performed, including indicating the number of bits to be coded for fixed-length coding, followed by actual fixed-length coding of thresholds using s(v) coding, e.g., per Table 2 below. S(v) coding represents signed fixed length coding of a value:

TABLE 2

| geometry_angular_enabled_flag | u(1) |
|---|---|
| if( geometry_angular_enabled_flag ){ | |
|   [added: "geom_globmotion_thresholds_bits_minus1 | ue(v)"] |
|   [added: "geom_globmotion_threshold0 | s(v)"] |
|   [added: "geom_globmotion_threshold1 | s(v)"] |
|   geom_slice_angular_origin_present_flag | u(1) |
|   if( !geom_slice_angular_origin_present_flag ) { | |
|     ... | |
| } | |

As shown in FIG. 11, there may be a maximum of two threshold values (z_bottom, z_top) in the scenario of classifying top, road, and bottom regions. In a typical scenario, the origin of the frame may be the center of LIDAR system, indicating z_top and z_bottom both are likely to be negative as the LIDAR system center/frame origin is likely to be well above the road. Secondly, the thresholds can be always arranged in a descending order, i.e., z_top>z_bottom. In such cases, G-PCC encoder 200 and G-PCC decoder 300 may be configured to code the first threshold as it is, and for the second threshold, G-PCC encoder 200 and G-PCC decoder 300 may code the difference between the second threshold value and the first threshold value. Moreover, as this delta would always be negative, it is possible to infer the sign of the delta, thus only the magnitude of the difference may be coded. Moreover, the difference cannot be zero, so instead magnitude of delta minus 1 may be coded. In certain scenarios, a single threshold may be enough when the bottom region is not very apparent. So, G-PCC encoder 200 and G-PCC decoder 300 may be configured to code a flag to indicate whether a second threshold is present or not. Syntax modification for the GPS, according to which G-PCC encoder 200 and G-PCC decoder 300 may be configured, may be as shown in Table 3 as follows:

TABLE 3

| | |
|---|---|
| geometry_angular_enabled_flag | u(1) |
| if( geometry_angular_enabled_flag ){ | |
|     [added: "geom_globmotion_threshold0 | se(v)"] |
|     [added: "geom_globmotion_threshold1_present | u(1)"] |
|     [added: "if(geom_globmotion_threshold1_present)"] | |
|     [added: "geom_globmotion_threshold1_absdelta_minus1 | ue(v)"] |
|     geom_slice_angular_origin_present_flag | u(1) |
|     if( !geom_slice_angular_origin_present_flag ) { | |
|     ... | |
| } | |

In another example, threshold1 may always be signaled and threshold0 may be signaled conditionally based on the value of a flag.

In another example, the mid-point of the two thresholds may be signaled (m), and a distance of the mid-point from either threshold (w) may be signaled; the two thresholds may be then derived as m−w and m+w. These values may be signaled using fixed length or variable length coding.

In another example, G-PCC encoder 200 and G-PCC decoder 300 may code data for these thresholds in GPS level, with a possibility of overriding/refining the thresholds in the GDH level.

In another example, G-PCC encoder 200 and G-PCC decoder 300 may code these thresholds together with the global motion information (rotation and translation factors).

In another example, G-PCC encoder 200 and G-PCC decoder 300 may code the thresholds in a separate parameter set, such as a parameter set dedicated to motion-related parameters.

In some examples, in addition or in the alternative to the techniques discussed above, G-PCC encoder 200 and G-PCC decoder 300 may be configured to implicitly classify points, e.g., as object or ground points, through coding points in slices corresponding to the classes. For example, if the point cloud includes object and ground (or road) point classes, G-PCC encoder 200 and G-PCC decoder 300 may code an object slice including a first subset of points that are all classified as object points, and a ground or road slice including a second subset of points that are all classified as ground or road points. More than two classes may be used in this way. In general, G-PCC encoder 200 and G-PCC decoder 300 may be configured to determine that there is one slice for each class of points, and that all points within a given slice are to be classified according to the corresponding class for the given slice. An explicit classification algorithm is not necessary in this example, which may reduce computations to be performed by G-PCC encoder 200 and G-PCC decoder 300.

More generally, G-PCC encoder 200 and G-PCC decoder 300 may be configured to perform the techniques below, alone or in any combination with the various other techniques of this disclosure:

1. Classification (or partitioning) of points of a point cloud into M groups. G-PCC encoder 200 and G-PCC decoder 300 may be configured according to one of the techniques of this disclosure, or other means to achieve the classification of the points into the M groups.
   a. Examples of groups include road, divider, nearby cars or vehicles, buildings, signs, traffic lights, pedestrians, etc. Note that each car/vehicle/building/ etc. may be classified as a separate group.
   b. Groups may include points that represent an object, or that are spatially adjacent to each other.

2. G-PCC encoder 200 and G-PCC decoder 300 may specify N slice groups (N<=M). G-PCC encoder 200 and G-PCC decoder 300 may associate each of the M groups with one of the N slice groups. G-PCC encoder 200 and G-PCC decoder 300 may code points belonging to a slice group together.
   a. E.g., a "ground" slice group may include points belonging to the "road" and "divider" groups, "static" slice group may include points belonging to "buildings", and "signs", and "dynamic" slice group may include groups such as cars/vehicles, or "pedestrians."
   b. More generally, G-PCC encoder 200 and G-PCC decoder 300 may code one or more groups that share some property into a slice group. For example, groups that may have similar relative motion with respect to the LIDAR sensor/vehicle, may be coded into one slice group.
   c. In another example, G-PCC encoder 200 and G-PCC decoder 300 may be configured to determine that each group of points having a certain property belongs to a separate slice group.
   d. Points of a group may be associated with more than one slice group (e.g., the points may be repeated).

3. G-PCC encoder 200 and G-PCC decoder 300 may code points belonging to each slice group in one or more slices.

4. G-PCC encoder 200 and G-PCC decoder 300 may identify a slice belonging to a slice group based on an index value (e.g., slice index) or a label (slice type or slice group type).
   a. Each slice group may be associated with a slice type/slice group type which may be signalled in each slice of the slice group.
      i. For example, an index/label of [0, N−1] may be associated with each of the slice groups and G-PCC encoder 200 and G-PCC decoder 300 may code an index/label "i" in a slice that belongs to the i-th slice group (0<=i<=N−1).
      ii. In another example, a point cloud may have two slice groups S1 and S2, and each slice group may be coded as 3 slices, making a total of 6 slices. Each of the slices of S1 may have slice type 0 and each of the slices of S2 may have slice type 1.
   b. In another example, each slice may be associated with a slice number of slice index; slice belonging to a particular slice group may be identified with the slice number/index.
      i. For example, a point cloud may have two slice groups S1 and S2, and each slice group may be coded as 3 slices, making a total of 6 slices. The slices of S1 may have slice numbers 0, 1 and 2, and slices of S2 may have slice numbers 3, 4 and 5.
   c. In some examples, the slice identifier may be a combination of the slice group identifier/type, and a slice number.
      i. For example, a point cloud may have two slice groups S1 and S2, and each slice group may be coded as 3 slices, making a total of 6 slices. The slices of S1 may have identifiers (0, 0), (0, 1), (0, 2) where the first number of each tuple is the slice type, and the second number is the slice number within the slice group. Similarly slices of S2 may have identifiers (1, 0), (1, 1), (1, 2).
   d. The slice type, slice group type, slice number, of slice identifier may be signalled in the slice.

5. G-PCC encoder 200 and G-PCC decoder 300 may code data referring to slices for prediction. A slice may refer to another slice for prediction. The reference slice may belong to the same picture (intra prediction) or another picture (inter prediction).
   a. G-PCC encoder 200 and G-PCC decoder 300 may identify the reference slice using one or more of the following:
      i. A reference frame number or frame counter
      ii. A reference slice identifier (slice type/group type, slice number, slice identifier, etc.)
   b. In some examples, G-PCC encoder 200 and G-PCC decoder 300 may be configured according to a restriction that a slice may only refer to other slices belonging to the same slice type/slice group type. In this case, a reference slice type/slice group type need not be signalled.
   c. In another example, a slice may be allowed to refer all points belonging to a frame or a slice group; in this case, a reference slice number may not be signalled as all the slices of a frame/slice group may be referred for prediction.
   d. In another example, two or more slice identifiers may be signalled identifying that plurality of slices that may referred for prediction.
6. G-PCC encoder 200 and G-PCC decoder 300 may associate a first set of motion parameters for each point; the motion parameters may be used to compensate the position of the point; this compensated position may be used as a reference for prediction.
   a. In one example, motion parameters associated with a point may be the motion parameters associated with a slice containing the point.
   b. In one example, motion parameters associated with a slice may be the motion parameters associated with a slice group containing the slice.
   c. In one example, the motion parameters associated with a slice group may be the motion parameters associated with the frame containing the slice group.
   d. The motion parameters may be signalled in a parameter set such as SPS, GPS, etc., slice header, or other parts of the bitstream.
   e. The above description refers to motion parameters, but this may apply to any set of motion parameters (e.g., rotation matrix/parameters, translation vector/parameters, etc.)
   f. In some examples, motion parameters used to apply motion compensation for points in a reference frame may be signalled in the current frame, or a frame that is not the reference frame. E.g., if frame 1 uses points from frame 0 for prediction, then the motion parameters that apply to points in frame 0 may be signalled with frame 1.
   g. In one example, a reference index to the slice/slice group of a reference frame may be signalled in the current frame (in a parameter set or a slice or other syntax structure).
      i. In one example, one or more tuples (motion parameters, a reference index) may be signalled with a current frame (or slice), where the reference index identifies the points in the reference frame (slice/slice group/region) to which the respective motion parameters apply.
   h. In one example, the motion parameters may be a set of global motion parameter that apply to all points in a slice, slice group, region, or frame.

One or more of the techniques of this disclosure may also apply to attributes, e.g., in addition or in the alternative to applying to points.

In some examples, G-PCC encoder 200 and G-PCC decoder 300 may be configured to specify one or more regions within a point cloud. G-PCC encoder 200 and G-PCC decoder 300 may further associate motion parameters with each region. G-PCC encoder 200 and G-PCC decoder 300 may code data in the bitstream representing the motion parameters associated with a region. G-PCC encoder 200 and G-PCC decoder 300 may use the motion parameters to compensate positions of points. G-PCC encoder 200 and G-PCC decoder 300 may use the compensated points as reference/prediction for coding the position of a point in a current frame. In some cases, the use of regions (compared with slices) for classification may achieve better compression performance, because G-PCC encoder 200 and G-PCC decoder 300 may code points belonging to different regions together.

1. G-PCC encoder 200 and G-PCC decoder 300 may code data representing one or more regions in a point cloud.
   a. G-PCC encoder 200 and G-PCC decoder 300 may code a value N representing the number of regions, as well as data representing parameters that specify each of the N regions.
      i. In some examples, N may be restricted to be within a certain value range (e.g., N may be constrained to less than a fixed value, such as 10).
   b. G-PCC encoder 200 and G-PCC decoder 300 may code the parameter of each region in the bitstream. In some examples, a region may be specified using one or more of the following parameters:
      i. An upper bound and lower bound for x, y, and z coordinates defining the region (or any other coordinate system used to code the point cloud).
      ii. In some examples, one or more of upper or lower bound may not be specified; in this case, G-PCC encoder 200 and G-PCC decoder 300 may use default values appropriate to the coordinate and the coordinate system as an inferred value.
         1. For example, in a spherical domain (r, phi, laserId), if bounds for phi are not signalled, then the upper and lower bound may be inferred to correspond to 360 degrees and 0 degrees, respectively.
2. Motion parameters may be associated with each region; motion compensation may be applied to one or more points belonging to the region to obtain compensated position/points; compensated positions/points may be used as reference for prediction of points in a current points cloud frame.
   a. One or more methods disclosed in this disclosure of signalling motion parameters may be applied to signal the motion parameters of each region. For example, G-PCC encoder 200 and G-PCC decoder 300 may code motion parameters for each region in a parameter set (e.g., SPS, GPS), or other parts of the bitstream (e.g., slice header, or a separate syntax structure).

G-PCC encoder 200 and G-PCC decoder 300 may be configured to perform any of the various techniques of this disclosure in various combination. For example, motion parameters for a reference frame may be specified in terms of regions, whereas one or more slice groups may be specified for the current frame; a slice group may be associated with a region (explicitly or implicitly) and reference points from region may be used to predict points of the slice group. In another example, points in a region may be coded as a slice or a slice group.

Figure 12:
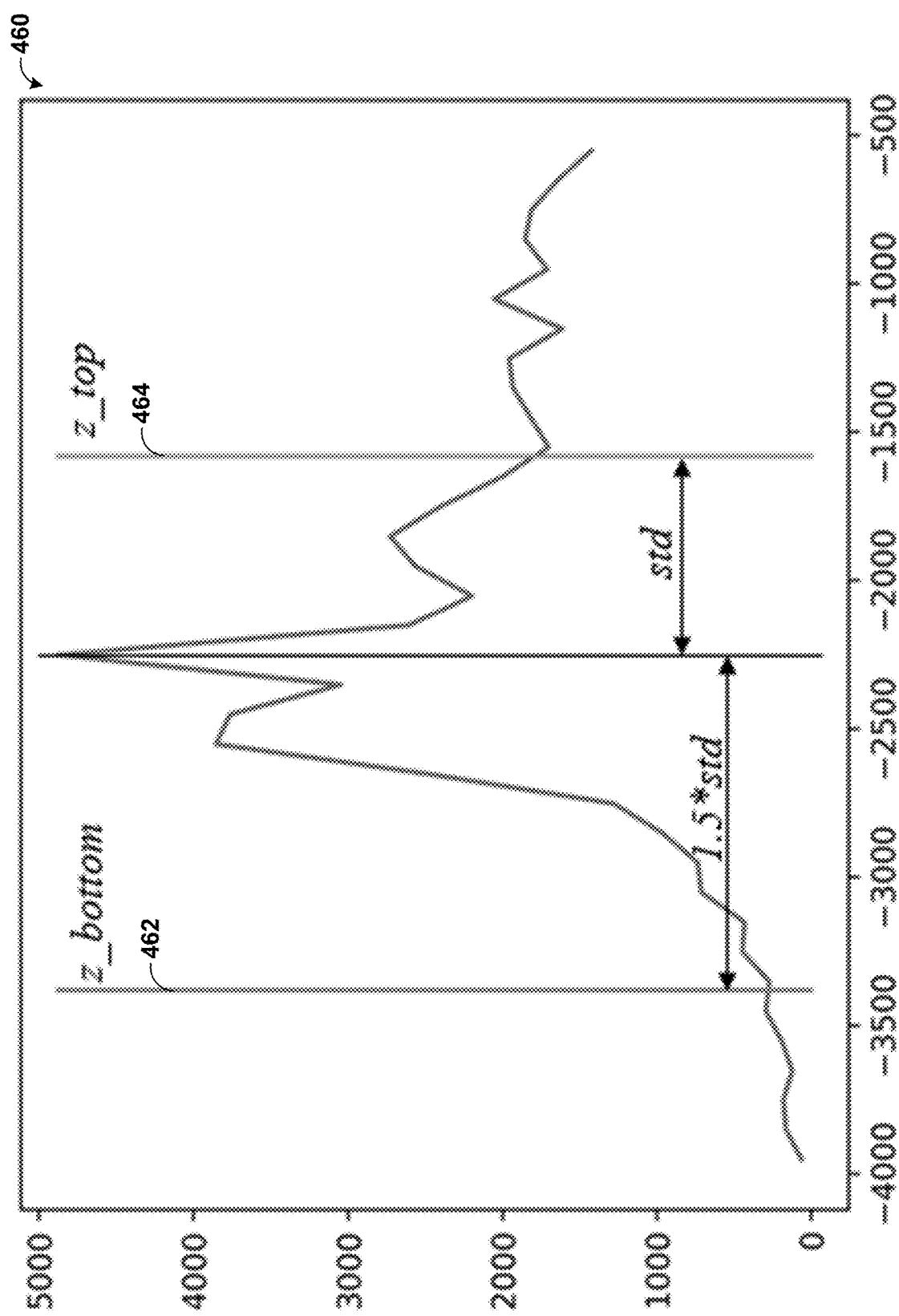
FIG. 12 is a graph illustrating an example derivation of thresholds using a histogram according to the techniques of this disclosure.

FIG. 12 is a graph 460 illustrating an example derivation of thresholds using a histogram according to the techniques of this disclosure. Graph 460 represents an example histogram for collected heights (z-values) of point cloud data. G-PCC encoder 200 may calculate thresholds z_bottom 462 and z_top 464 using the histogram.

In an example implementation, G-PCC encoder 200 may downscale the cloud (sub-sample) with the size of hist_bin_size, which may be defined as follows:

$$\text{hist\_bin\_size} = \text{int}((\text{max\_box\_t} - \text{min\_box\_t})/\text{hist\_scale})$$

where max_box_t and min_box_t is the range of z values in the cloud, which will be used to get the thresholds. Max_box_t may be lower than the maximum value of z in the cloud and min_box_t may be higher than the minimum values of z in the cloud.

Next, G-PCC encoder 200 may derive the histogram of the points with z-values in the range min_box_t to max_box_t as follows (which is example Python code, although other implementations in other languages or in hardware may also be used):

$$n, \text{bins} =$$

$$np.\text{histogram}(\text{source\_points\_ori}, \text{hist\_bin\_size}, (\text{min\_box\_t}, \text{max\_box\_t}))$$

In this example, np is the representative of numpy library (numpy.org), and source_points_ori is the set of the points with z values being in the range min_box_t to max_box_t.

After this, G-PCC encoder 200 may calculate the standard deviation (std) 466 of the histogram, e.g., according to the following Python code (although other implementations in other languages or in hardware may also be used):

$$\text{mids} = 0.5 * (\text{bins}[1:] + \text{bins}[:-1])$$

$$\text{probs} = n/np.\text{sum}(n)$$

$$\text{mean} = np.\text{sum}(\text{probs} * \text{mids})$$

$$\text{std} = np.\text{sqrt}(np.\text{sum}(\text{probs} * (\text{mids} - \text{mean})**2))$$

Finally, in this example, G-PCC encoder 200 may derive z_bottom 462 and z_top 464 as follows: G-PCC encoder 200 determines the bin index in the histogram (top_idx_n, bin 470 in the example of FIG. 12) which has the maximum count of points. G-PCC encoder 200 determines the thresholds z_top (z_top 464) and z_bottom (z_bottom 462) by shifting to the right and the left from bin 470 (that is, the bin that has the maximum count of points) by values related to std, e.g., 1*std 466 and 1.5*std 468 in the example of FIG. 12. The following Python code represents an example technique by which the thresholds may be derived:

$$\text{top\_idx\_n} = np.\text{where}(n == n.\text{max}())$$

$$\text{z\_top} = \min(\text{bins}[\text{top\_idx\_n}] + \text{w\_top} * std, \text{max\_box\_t})$$

$$\text{z\_bottom} = \max(\text{bins}[\text{top\_idx\_n}] - \text{w\_bottom} * std, \text{max\_box\_t})$$

where w_top and w_bottom are predefined positive values.

In the example of FIG. 12, (max_box_t, min_box_t) is set equal to (−500, −4000) for the 100$^{th}$ frame of a collected data set. In FIG. 12, (w_top, w_bottom) is set equal to (1, 1.5).

Figure 13:
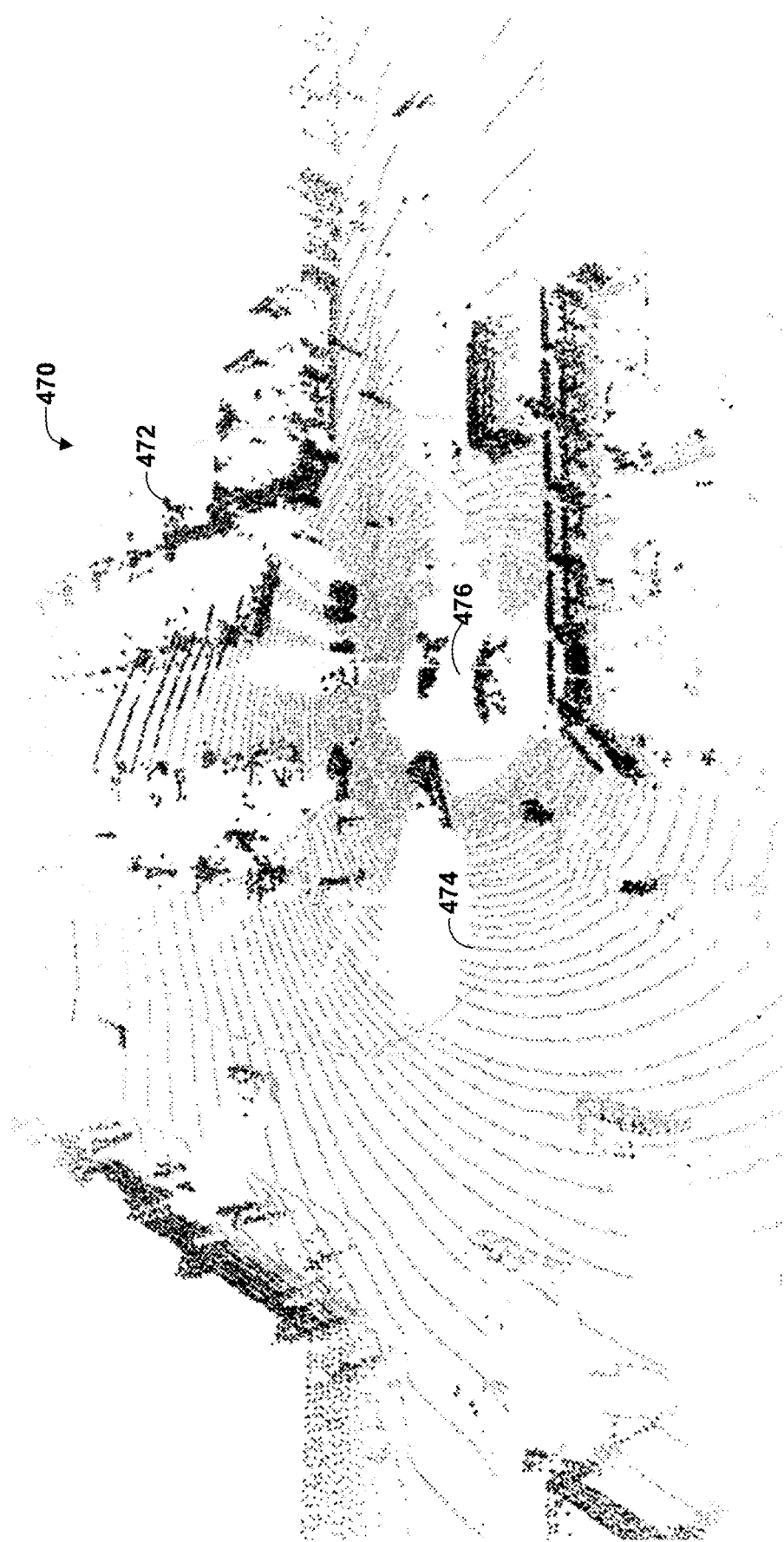
FIG. 13 is a conceptual diagram illustrating labeling of points in a cloud into road and objects according to the techniques of this disclosure.

FIG. 13 is a conceptual diagram illustrating labeling of points in point cloud 470 into road points 474 and object points 472 according to the techniques of this disclosure. An automobile equipped with a LIDAR system (not shown in FIG. 13) generally positioned at point 476 may collect data from a surrounding environment to construct point cloud 470. A G-PCC encoder, such as G-PCC encoder 200, within the automobile may determine thresholds for classifying points of point cloud 470 into road points or object points. After determining the threshold (e.g., according to the techniques of FIG. 12), G-PCC encoder 200 may label points of point cloud 470 as ground/road points 474 or object points 472.

FIG. 13 represents a visualization of these sets of points, where object points 472 are darkly shaded and road points 474 (also referred to as ground points) are lightly shaded. As can be seen in the example of FIG. 13, lightly shaded road points 474 are generally spread across an even plane (e.g., the ground or a road on the ground), whereas darkly shaded object points 472 generally define objects such as fences, signs, buildings, or other objects near the position of the automobile when point cloud 470 was generated.

Figure 14:
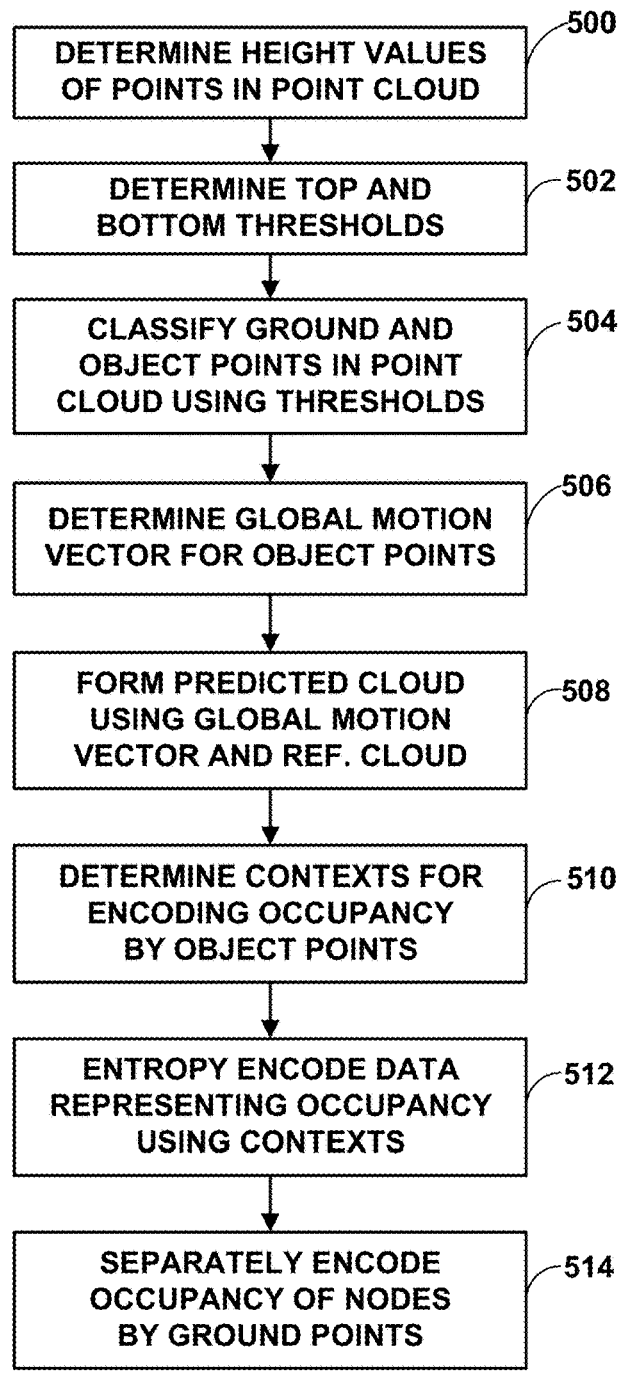
FIG. 14 is a flowchart illustrating an example method of encoding a point cloud according to the techniques of this disclosure.

FIG. 14 is a flowchart illustrating an example method of encoding a point cloud according to the techniques of this disclosure. The method of FIG. 14 is explained with respect to G-PCC encoder 200 of FIGS. 1 and 2. Other G-PCC encoding devices may be configured to perform this or a similar method.

Initially, G-PCC encoder 200 may obtain a point cloud to be encoded, e.g., current cloud 140 of FIG. 3. The point cloud may include a set of points, each of which has a geometric position (e.g., expressed in (x, y, z) coordinates) and one or more attributes. G-PCC encoder 200 may then determine height values of the points in the point cloud (500), e.g., using the z-values of the geometric positions of the points. G-PCC encoder 200 may then determine top and bottom thresholds (502) and classify ground and object points in the point cloud using the thresholds (504). For example, G-PCC encoder 200 may determine the thresholds using the techniques discussed above with respect to FIGS. 11 and 12. G-PCC encoder 200 may then classify points between the top and bottom thresholds as ground points, and other points as object points. G-PCC encoder 200 may also encode a data structure (e.g., an SPS, GPS, GDH, or the like) including data representative of the top and bottom thresholds. The data structure may conform to the examples of any of Tables 1-3 above.

G-PCC encoder 200 may then calculate a global motion vector for the object points (506). For example, as shown in FIG. 3, G-PCC encoder 200 may calculate global motion vector 132 for the set of object points. The global motion vector may generally represent the motion vector that best yields predicted cloud 134 (that is, that yields a predicted cloud including points that most closely match current cloud 140 relative to reference cloud 130). After obtaining the global motion vector, G-PCC encoder 200 may generate predicted cloud 134 using global motion vector 132 relative to reference cloud 130 (508).

G-PCC encoder 200 may then determine contexts for encoding occupancy of nodes of current cloud 140 by the determined object points using predicted cloud 134 (510). G-PCC encoder 200 may further entropy encode data representing occupancy of nodes by object points using the contexts (512). In particular, for a given node of current cloud 140, G-PCC encoder 200 may determine whether a corresponding node (having the same size and position within predicted cloud 134) is occupied by at least one object point. If the corresponding node is occupied (i.e., includes at least one object point), G-PCC encoder 200 may determine a context for encoding a value indicating whether the current node is occupied as having a high likelihood indicating the current node of current cloud 140 is also occupied. If the corresponding node is not occupied (i.e., does not include any object points), G-PCC encoder 200 may determine the context for encoding the value indicating whether the current node is occupied as having a high likelihood of indicating that the current node of current cloud 140 is not occupied.

G-PCC encoder 200 may then encode the value using the determined context. If the current node was not occupied, G-PCC encoder 200 may proceed to a new node. On the other hand, if the current node was occupied, G-PCC encoder 200 may partition the current node into eight sub-nodes and encode occupancy data for each of the eight sub-nodes in the same manner.

G-PCC encoder 200 may then also separately encode data representing occupancy of nodes by ground points (514). For example, G-PCC encoder 200 may encode the data representing occupancy of nodes by the ground points using a second different global motion vector, local motion vectors, and/or intra-prediction.

In this manner, the method of FIG. 14 represents an example of a method of coding point cloud data, including determining height values of points in a point cloud; classifying the points into a set of ground points or a set of object points according to the height values; and coding the ground points and the object points according to the classifications.

Figure 15:
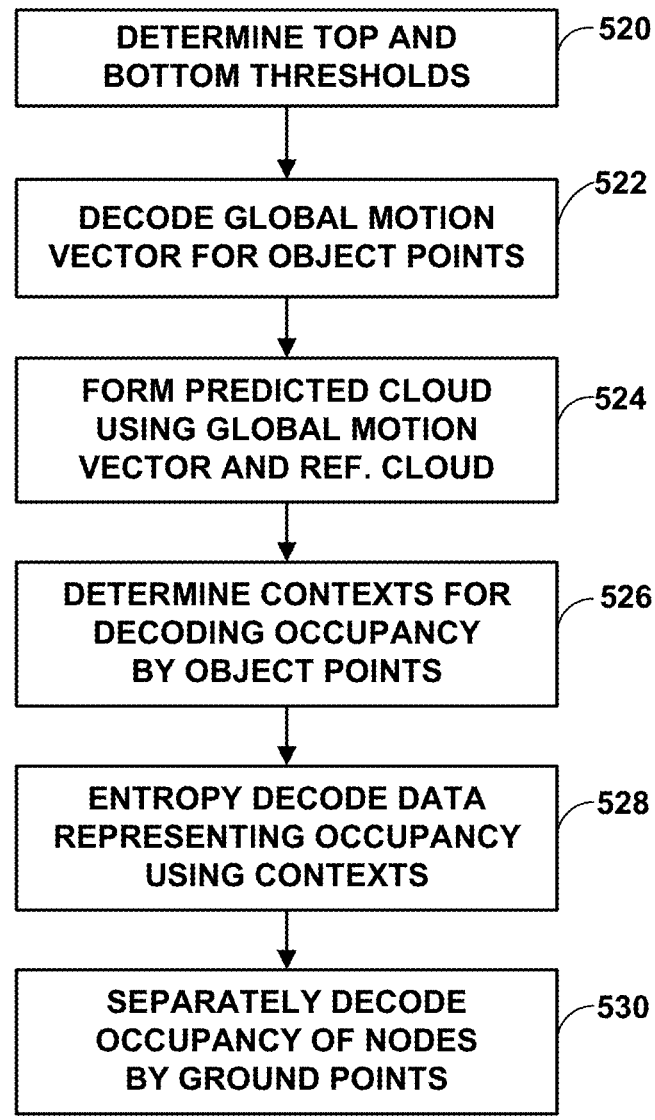
FIG. 15 is a flowchart illustrating an example method of decoding a point cloud according to the techniques of this disclosure.

FIG. 15 is a flowchart illustrating an example method of decoding a point cloud according to the techniques of this disclosure. The method of FIG. 15 is explained as being performed by G-PCC decoder 300 of FIGS. 1 and 4. However, in other examples, other decoding devices may be configured to perform this or a similar method.

Initially, G-PCC decoder 300 may determine top and bottom threshold values (520). For example, G-PCC decoder 300 may decode a data structure (e.g., an SPS, GPS, GDH, or the like) including data representative of the top and bottom thresholds. The data structure may conform to the examples of any of Tables 1-3 above. G-PCC decoder 300 may further decode a global motion vector for object points (522), that is, points within nodes having height values outside of a range between the top and bottom thresholds. For example, G-PCC decoder 300 may decode data representing occupancy of nodes above a top threshold and/or below the bottom threshold using the global motion vector, as follows.

G-PCC decoder 300 may form a predicted cloud (e.g., predicted cloud 154 of FIG. 5) using the global motion vector (e.g., global motion vector 152) relative to reference cloud 150 (524). G-PCC decoder 300 may then use points within predicted cloud 154 to determine contexts for decoding data representative of occupancy of nodes in current cloud 160 (526). In particular, for a given node of current cloud 160, G-PCC decoder 300 may determine whether a corresponding node (having the same size and position within predicted cloud 154) is occupied by at least one object point. If the corresponding node is occupied (i.e., includes at least one object point), G-PCC decoder 300 may determine a context for decoding a value indicating whether the current node is occupied as having a high likelihood indicating the current node of current cloud 160 is also occupied. If the corresponding node is not occupied (i.e., does not include any object points), G-PCC decoder 300 may determine the context for encoding the value indicating whether the current node is occupied as having a high likelihood of indicating that the current node of current cloud 160 is not occupied.

G-PCC decoder 300 may then entropy decode data representing occupancy of the nodes using the contexts (528). If the decoded data indicates that the current node was not occupied, G-PCC decoder 300 may proceed to a new node. On the other hand, if the current node was occupied, G-PCC decoder 300 may partition the current node into eight sub-nodes and decode occupancy data for each of the eight sub-nodes in the same manner.

G-PCC decoder 300 may also separately decode data representing occupancy of nodes by ground points (530), e.g., using a different global motion vector, local motion vectors, and/or intra-prediction.

Figure 16:
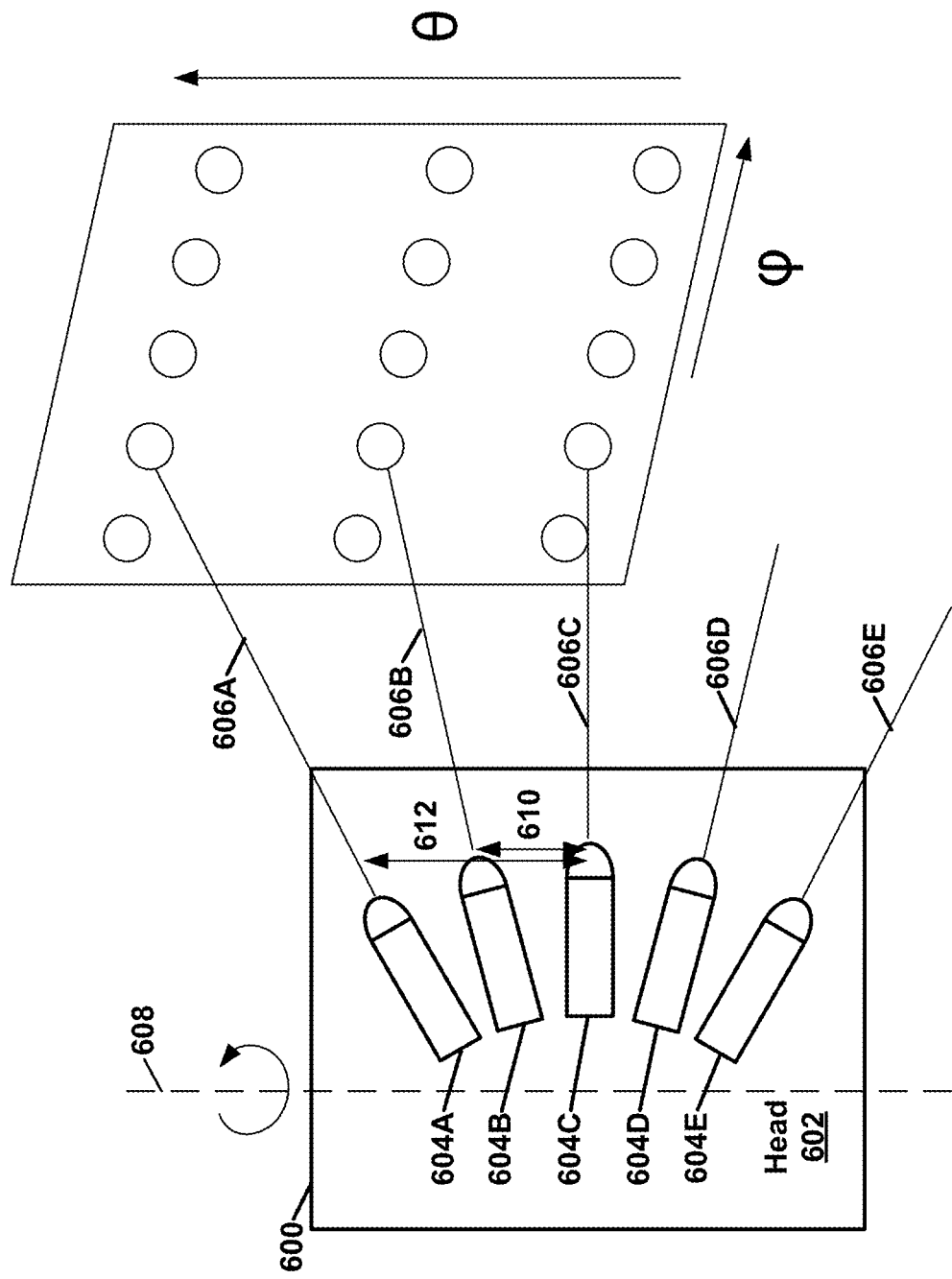
FIG. 16 is a conceptual diagram illustrating a laser package, such as a LIDAR sensor or other system that includes one or more lasers, scanning points in 3-dimensional space.

FIG. 16 is a conceptual diagram illustrating a laser package 600, such as a LIDAR sensor or other system that includes one or more lasers, scanning points in 3-dimensional space. Laser package 600 may correspond to LIDAR 380 of FIG. 7. Data source 104 (FIG. 1) may include laser package 600.

As shown in FIG. 16, point clouds can be captured using laser package 600, i.e., the sensor scans the points in 3D space. It is to be understood, however, that some point clouds are not generated by an actual LIDAR sensor but may be encoded as if they were. In the example of FIG. 16, laser package 600 includes a LIDAR head 602 that includes multiple lasers 604A-604E (collectively, "lasers 604") arrayed in a vertical plane at different angles relative to an origin point. Laser package 600 may rotate around a vertical axis 608. Laser package 600 may use returned laser light to determine the distances and positions of points of the point cloud. Laser beams 606A-606E (collectively, "laser beams 606") emitted by lasers 604 of laser package 600 may be characterized by a set of parameters. Distances denoted by arrows 610, 612 denotes an example laser correction values for laser 604B, 604A, respective.

Certain lasers 604 may generally identify object points, whereas other lasers 604 may generally identify ground points. Using the techniques of this disclosure, the points may be classified as either ground or object points and encoded or decoded accordingly.

Figure 17:
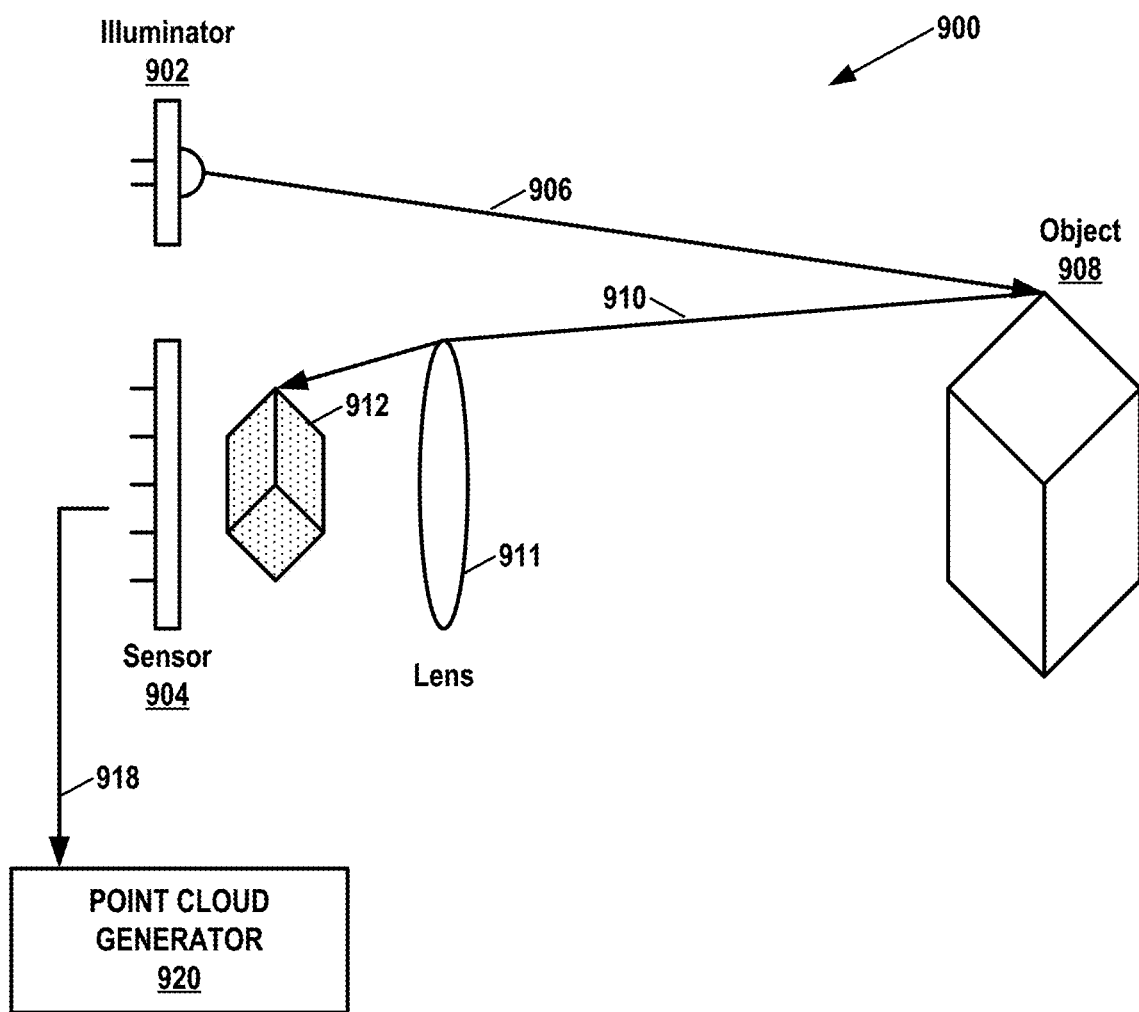
FIG. 17 is a conceptual diagram illustrating an example range-finding system 900 that may be used with one or more techniques of this disclosure.

FIG. 17 is a conceptual diagram illustrating an example range-finding system 900 that may be used with one or more techniques of this disclosure. In the example of FIG. 17, range-finding system 900 includes an illuminator 902 and a sensor 904. Illuminator 902 may emit light 906. In some examples, illuminator 902 may emit light 906 as one or more laser beams. Light 906 may be in one or more wavelengths, such as an infrared wavelength or a visible light wavelength. In other examples, light 906 is not coherent, laser light. When light 906 encounters an object, such as object 908, light 906 creates returning light 910. Returning light 910 may include backscattered and/or reflected light. Returning light 910 may pass through a lens 911 that directs returning light 910 to create an image 912 of object 908 on sensor 904. Sensor 904 generates signals 914 based on image 912.

Image 912 may comprise a set of points (e.g., as represented by dots in image 912 of FIG. 17).

In some examples, illuminator 902 and sensor 904 may be mounted on a spinning structure so that illuminator 902 and sensor 904 capture a 360-degree view of an environment. In other examples, range-finding system 900 may include one or more optical components (e.g., mirrors, collimators, diffraction gratings, etc.) that enable illuminator 902 and sensor 904 to detect objects within a specific range (e.g., up to 360-degrees). Although the example of FIG. 17 only shows a single illuminator 902 and sensor 904, range-finding system 900 may include multiple sets of illuminators and sensors.

In some examples, illuminator 902 generates a structured light pattern. In such examples, range-finding system 900 may include multiple sensors 904 upon which respective images of the structured light pattern are formed. Range-finding system 900 may use disparities between the images of the structured light pattern to determine a distance to an object 908 from which the structured light pattern backscatters. Structured light-based range-finding systems may have a high level of accuracy (e.g., accuracy in the sub-millimeter range), when object 908 is relatively close to sensor 904 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 900 is a time of flight (ToF)-based system. In some examples where range-finding system 900 is a ToF-based system, illuminator 902 generates pulses of light. In other words, illuminator 902 may modulate the amplitude of emitted light 906. In such examples, sensor 904 detects returning light 910 from the pulses of light 906 generated by illuminator 902. Range-finding system 900 may then determine a distance to object 908 from which light 906 backscatters based on a delay between when light 906 was emitted and detected and the known speed of light in air). In some examples, rather than (or in addition to) modulating the amplitude of the emitted light 906, illuminator 902 may modulate the phase of the emitted light 1404. In such examples, sensor 904 may detect the phase of returning light 910 from object 908 and determine distances to points on object 908 using the speed of light and based on time differences between when illuminator 902 generated light 906 at a specific phase and when sensor 904 detected returning light 910 at the specific phase.

In other examples, a point cloud may be generated without using illuminator 902. For instance, in some examples, sensor 904 of range-finding system 900 may include two or more optical cameras. In such examples, range-finding system 900 may use the optical cameras to capture stereo images of the environment, including object 908. Range-finding system 900 (e.g., point cloud generator 920) may then calculate the disparities between locations in the stereo images. Range-finding system 900 may then use the disparities to determine distances to the locations shown in the stereo images. From these distances, point cloud generator 920 may generate a point cloud.

Sensors 904 may also detect other attributes of object 908, such as color and reflectance information. In the example of FIG. 17, a point cloud generator 920 may generate a point cloud based on signals 918 generated by sensor 904. Range-finding system 900 and/or point cloud generator 920 may form part of data source 104 (FIG. 1).

Figure 18:
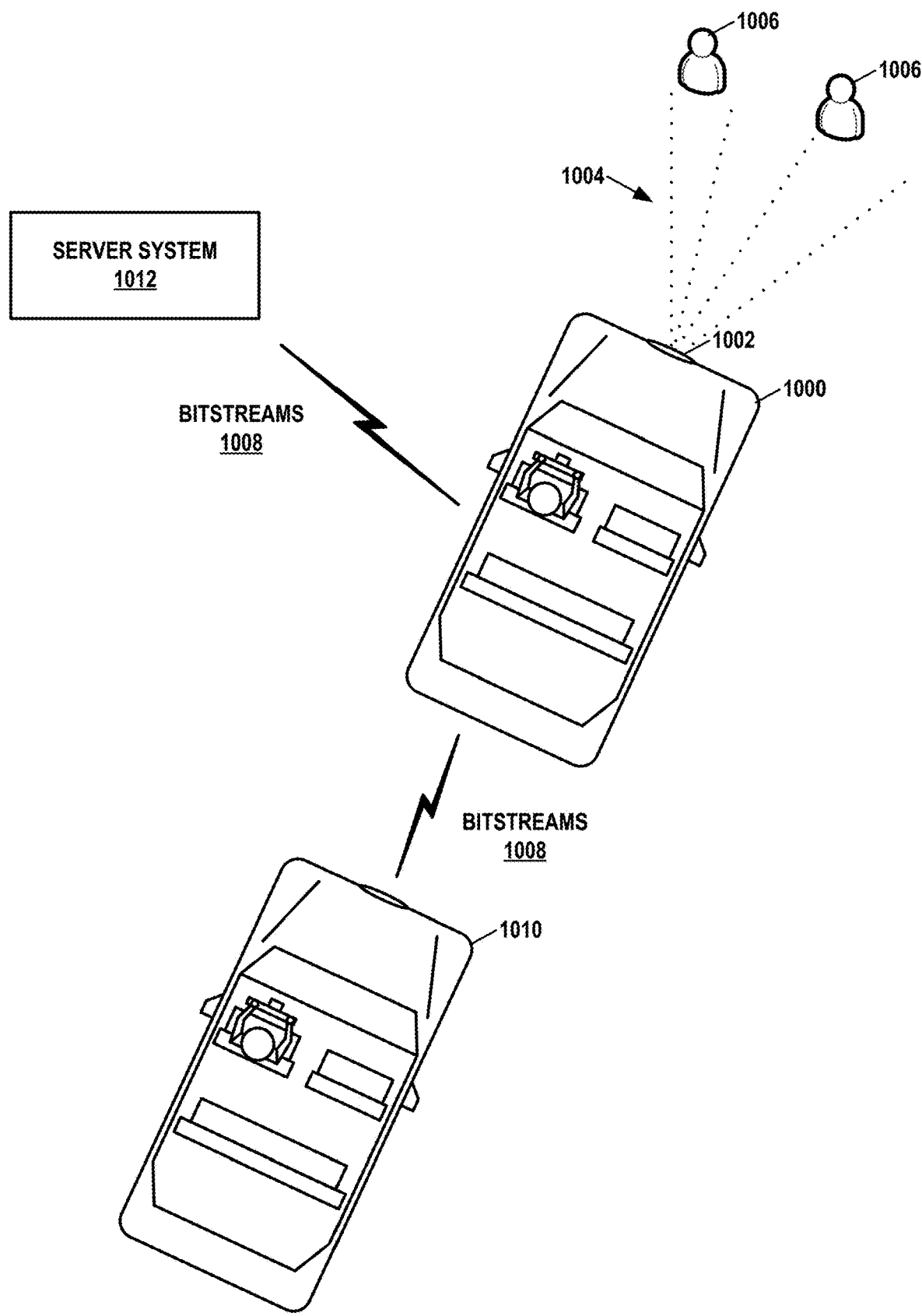
FIG. 18 is a conceptual diagram illustrating an example vehicle-based scenario in which one or more techniques of this disclosure may be used.

FIG. 18 is a conceptual diagram illustrating an example vehicle-based scenario in which one or more techniques of this disclosure may be used. In the example of FIG. 18, a vehicle 1000 includes a laser package 1002, such as a LIDAR system. Laser package 1002 may be implemented in the same manner as laser package 600 (FIG. 16). Although not shown in the example of FIG. 18, vehicle 1000 may also include a data source, such as data source 104 (FIG. 1), and a G-PCC encoder, such as G-PCC encoder 200 (FIG. 1). In the example of FIG. 18, laser package 1002 emits laser beams 1004 that reflect off pedestrians 1006 or other objects in a roadway. The data source of vehicle 1000 may generate a point cloud based on signals generated by laser package 1002. The G-PCC encoder of vehicle 1000 may encode the point cloud to generate bitstreams 1008, such as the geometry bitstream of FIG. 2 and the attribute bitstream of FIG. 2. Bitstreams 1008 may include many fewer bits than the unencoded point cloud obtained by the G-PCC encoder. An output interface of vehicle 1000 (e.g., output interface 108 (FIG. 1) may transmit bitstreams 1008 to one or more other devices. Thus, vehicle 1000 may be able to transmit bitstreams 1008 to other devices more quickly than the unencoded point cloud data. Additionally, bitstreams 1008 may require less data storage capacity.

The techniques of this disclosure may further reduce the number of bits in bitstreams 1008. For instance, separately encoding object points from ground points, e.g., using global motion information for the object points, may reduce the number of bits in bitstreams 1008 associated with the object points.

In the example of FIG. 18, vehicle 1000 may transmit bitstreams 1008 to another vehicle 1010. Vehicle 1010 may include a G-PCC decoder, such as G-PCC decoder 300 (FIG. 1). The G-PCC decoder of vehicle 1010 may decode bitstreams 1008 to reconstruct the point cloud. Vehicle 1010 may use the reconstructed point cloud for various purposes. For instance, vehicle 1010 may determine based on the reconstructed point cloud that pedestrians 1006 are in the roadway ahead of vehicle 1000 and therefore start slowing down, e.g., even before a driver of vehicle 1010 realizes that pedestrians 1006 are in the roadway. Thus, in some examples, vehicle 1010 may perform an autonomous navigation operation, generate a notification or warning, or perform another action based on the reconstructed point cloud.

Additionally or alternatively, vehicle 1000 may transmit bitstreams 1008 to a Server system 1012. Server system 1012 may use bitstreams 1008 for various purposes. For example, server system 1012 may store bitstreams 1008 for subsequent reconstruction of the point clouds. In this example, server system 1012 may use the point clouds along with other data (e.g., vehicle telemetry data generated by vehicle 1000) to train an autonomous driving system. In other example, server system 1012 may store bitstreams 1008 for subsequent reconstruction for forensic crash investigations (e.g., if vehicle 1000 collides with pedestrians 1006).

Figure 19:
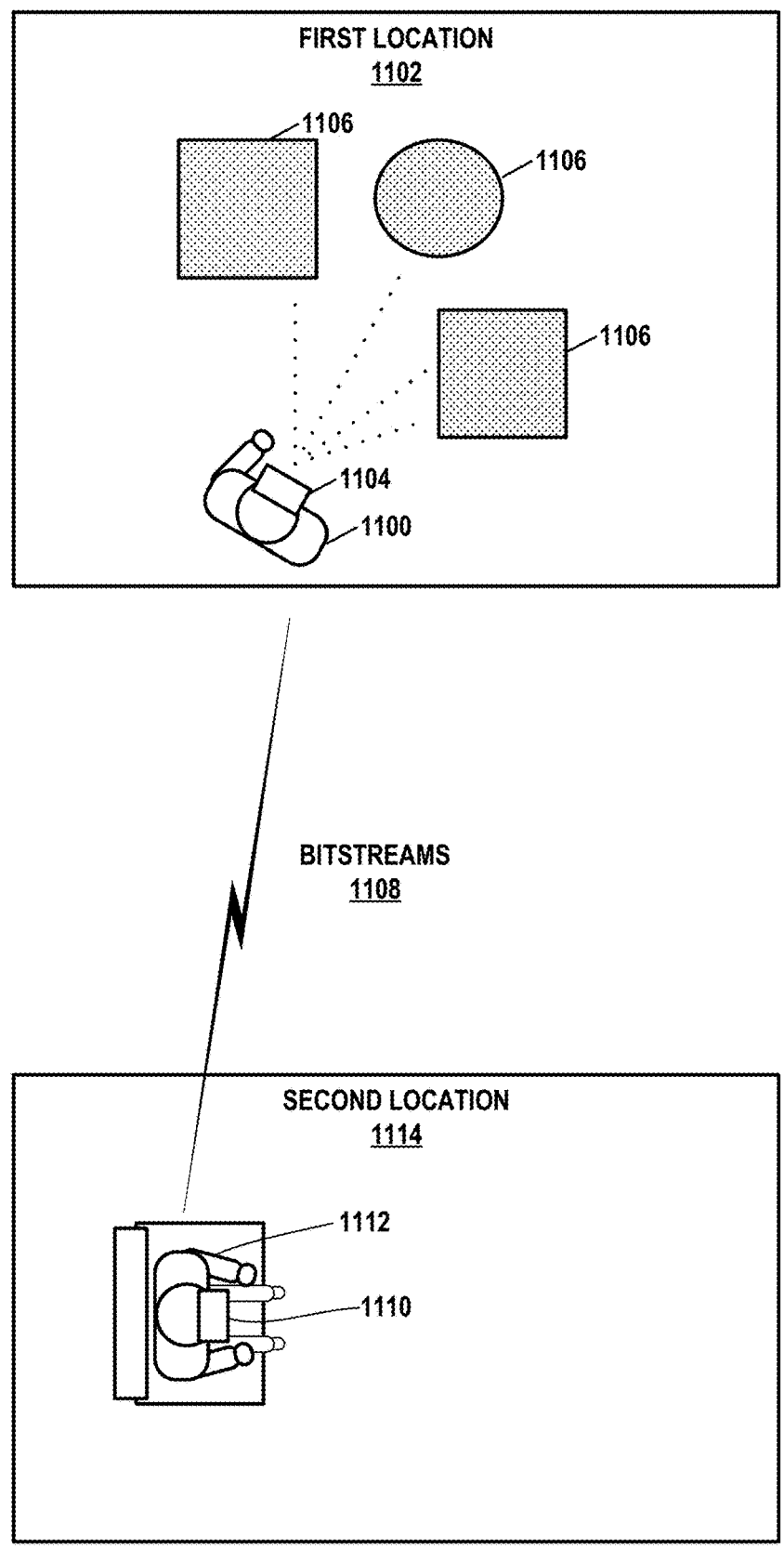
FIG. 19 is a conceptual diagram illustrating an example extended reality system in which one or more techniques of this disclosure may be used.

FIG. 19 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 19, a first user 1100 is located in a first location 1102. User 1100 wears an XR headset 1104. As an alternative to XR headset 1104, user 1100 may use a mobile device (e.g., mobile phone, tablet computer, etc.). XR headset 1104 includes a depth detection sensor, such as a LIDAR system, that detects positions of points on objects 1106 at location 1102. A data source of XR headset 1104 may use the signals generated by the depth detection sensor to generate a point cloud representation of objects 1106 at location 1102. XR headset 1104 may include a G-PCC encoder (e.g., G-PCC encoder 200 of FIG. 1) that is configured to encode the point cloud to generate bitstreams 1108.

The techniques of this disclosure may further reduce the number of bits in bitstreams 1108. For instance, separately encoding object points from ground points, e.g., using common global motion information for the object points, may reduce the number of bits in bitstreams 1108 associated with the third laser angle.

XR headset 1104 may transmit bitstreams 1108 (e.g., via a network such as the Internet) to an XR headset 1110 worn by a user 1112 at a second location 1114. XR headset 1110 may decode bitstreams 1108 to reconstruct the point cloud. XR headset 1110 may use the point cloud to generate an XR visualization (e.g., an AR, MR, VR visualization) representing objects 1106 at location 1102. Thus, in some examples, such as when XR headset 1110 generates a VR visualization, user 1112 at location 1114 may have a 3D immersive experience of location 1102. In some examples, XR headset 1110 may determine a position of a virtual object based on the reconstructed point cloud. For instance, XR headset 1110 may determine, based on the reconstructed point cloud, that an environment (e.g., location 1102) includes a flat surface and then determine that a virtual object (e.g., a cartoon character) is to be positioned on the flat surface. XR headset 1110 may generate an XR visualization in which the virtual object is at the determined position. For instance, XR headset 1110 may show the cartoon character sitting on the flat surface.

Figure 20:
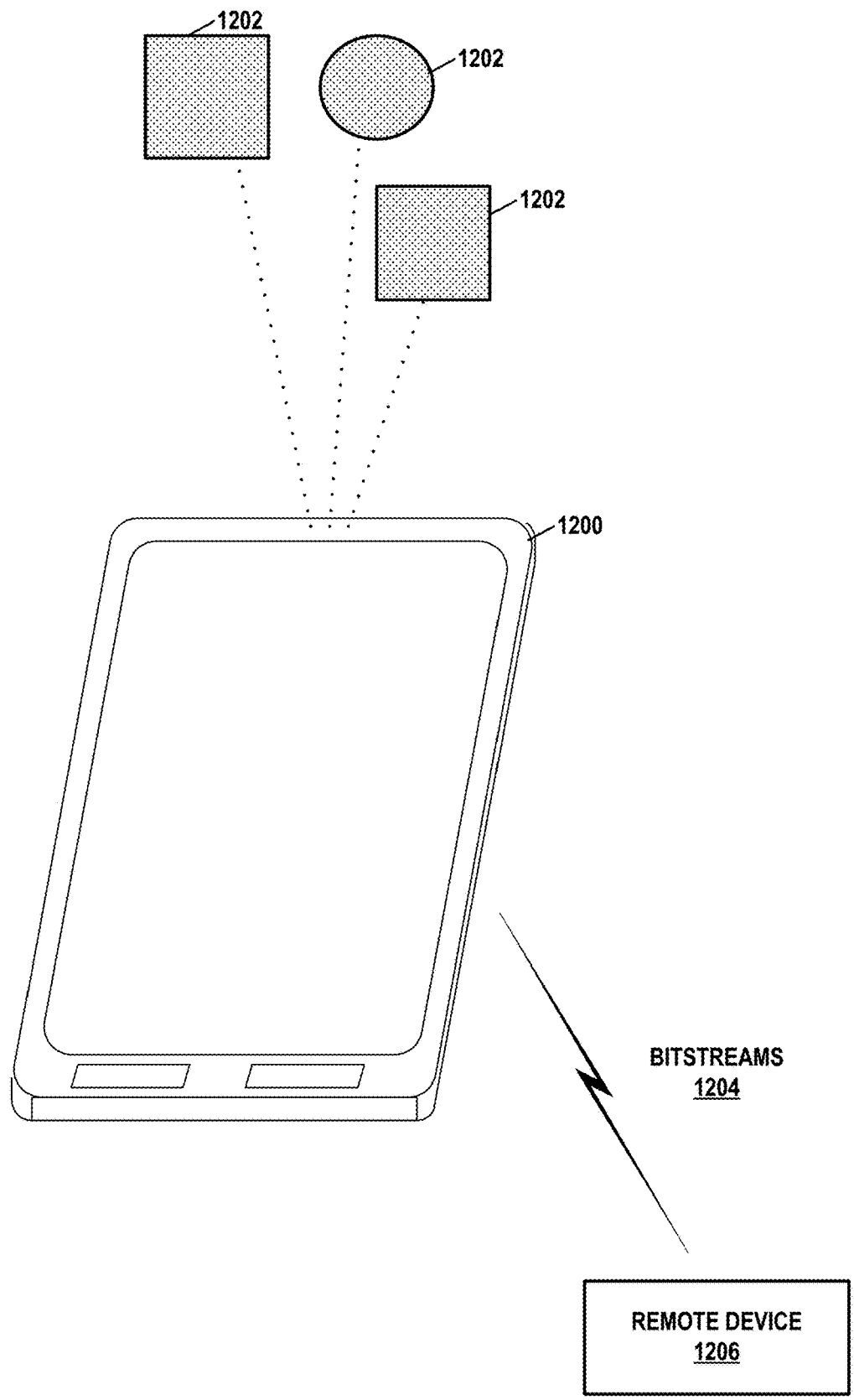
FIG. 20 is a conceptual diagram illustrating an example mobile device system in which one or more techniques of this disclosure may be used.

FIG. 20 is a conceptual diagram illustrating an example mobile device system in which one or more techniques of this disclosure may be used. In the example of FIG. 20, a mobile device 1200, such as a mobile phone or tablet computer, includes a depth detection sensor, such as a LIDAR system, that detects positions of points on objects 1202 in an environment of mobile device 1200. A data source of mobile device 1200 may use the signals generated by the depth detection sensor to generate a point cloud representation of objects 1202. Mobile device 1200 may include a G-PCC encoder (e.g., G-PCC encoder 200 of FIG. 1) that is configured to encode the point cloud to generate bitstreams 1204. In the example of FIG. 20, mobile device 1200 may transmit bitstreams to a remote device 1206, such as a server system or other mobile device. Remote device 1206 may decode bitstreams 1204 to reconstruct the point cloud. Remote device 1206 may use the point cloud for various purposes. For example, remote device 1206 may use the point cloud to generate a map of environment of mobile device 1200. For instance, remote device 1206 may generate a map of an interior of a building based on the reconstructed point cloud. In another example, remote device 1206 may generate imagery (e.g., computer graphics) based on the point cloud. For instance, remote device 1206 may use points of the point cloud as vertices of polygons and use color attributes of the points as the basis for shading the polygons. In some examples, remote device 1206 may perform facial recognition using the point cloud.

The following clauses represent various examples of techniques described in this disclosure:

Clause 1: A method of coding point cloud data, the method comprising: determining height values of points in a point cloud; classifying the points into a set of ground points or a set of object points according to the height values; and coding the ground points and the object points according to the classifications.

Clause 2: The method of clause 1, wherein classifying the points comprises: determining a top threshold and a bottom threshold; classifying points having height values between the top threshold and the bottom threshold into the set of ground points; and classifying points having height values above the top threshold or below the bottom threshold into the set of object points.

Clause 3: The method of any of clauses 1 and 2, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 4: The method of clause 3, wherein the $i^{th}$ value range comprises an $i^{th}$ value range of N value ranges.

Clause 5: The method of any of clauses 3 and 4, wherein $x\_min_i$ and $y\_min_i$ have values of negative infinity, and $x\_max_i$ and $y\_max_i$ have values of infinity.

Clause 6: The method of any of clauses 2-5, wherein coding the ground points and the object points further comprises: quantizing the ground points and the object points by a scaling factor; and quantizing the top threshold and the bottom threshold by the scaling factor.

Clause 7: The method of any of clauses 2-6, wherein coding the object points comprises: deriving a set of global motion for the object points; and predicting the object points using the set of global motion.

Clause 8: The method of clause 7, wherein deriving the set of global motion comprises deriving the set of global motion only from the object points.

Clause 9: The method of any of clauses 7 and 8, wherein the set of global motion comprises a first set of global motion, and wherein coding the ground points comprises: deriving a second set of global motion for the ground points; and predicting the ground points using the second set of global motion.

Clause 10: The method of clause 9, wherein deriving the second set of global motion comprises deriving the second set of global motion only from the ground points.

Clause 11: The method of any of clauses 7-10, wherein deriving the set of global motion comprises deriving a rotation matrix and a translation vector, and wherein coding the object points comprises applying the rotation matrix and the translation vector to reference points of a reference frame.

Clause 12: The method of clause 11, wherein coding the object points further comprises: determining local node motion vectors of nodes of a prediction tree, the nodes including respective sets of reference points of the reference frame; and applying the local node motion vectors to the nodes.

Clause 13: The method of any of clauses 2-12, wherein determining the top threshold and the bottom threshold comprises determining the top threshold and the bottom threshold for a group of pictures (GOP) including a plurality of frames including the point cloud.

Clause 14: The method of any of clauses 2-12, wherein determining the top threshold and the bottom threshold comprises determining the top threshold and the bottom threshold for a sequence parameter set (SPS) corresponding to a plurality of frames including the point cloud.

Clause 15: The method of any of clauses 13 and 14, wherein determining the top threshold and the bottom threshold comprises determining the top threshold and the bottom threshold for an ordinal first frame of the plurality of frames.

Clause 16: The method of any of clauses 13 and 14, wherein determining the top threshold and the bottom threshold comprises determining the top threshold and the bottom threshold as a weighted average of threshold for the plurality of frames.

Clause 17: The method of any of clauses 2-16, further comprising coding a global parameter set (GPS) including data representing at least one of the top threshold or the bottom threshold.

Clause 18: The method of clause 17, wherein coding the GPS comprises coding a value for the top threshold and a flag indicating whether data is to be coded for the bottom threshold.

Clause 19: The method of any of clauses 17 and 18, wherein coding the data for the at least one of the top threshold or the bottom threshold comprises: coding a value for a geom_globmotion_threshold0 representing the top threshold; and coding a value for a geom_globmotion_threshold1 representing the bottom threshold.

Clause 20: The method of any of clauses 17-19, wherein coding the data representing the at least one of the top threshold or the bottom threshold comprises coding the data representing the at least one of the top threshold or the bottom threshold using respective unsigned integer $0^{th}$ order Exp-Golomb values.

Clause 21: The method of any of clauses 17-19, wherein coding the data representing the at least one of the top threshold or the bottom threshold comprises coding the data representing the at least one of the top threshold or the bottom threshold using respective signed integer $0^{th}$ order Exp-Golomb values.

Clause 22: The method of any of clauses 17-19, wherein coding the data representing the at least one of the top threshold or the bottom threshold comprises coding the data representing the at least one of the top threshold or the bottom threshold using respective signed fixed length values, the method further comprising coding data representing a number of bits assigned to the at least one of the top threshold or the bottom threshold.

Clause 23: The method of any of clauses 17-22, wherein coding the data representing the at least one of the top threshold or the bottom threshold comprises: coding data representing a midpoint between the top threshold and the bottom threshold; and coding data representing a distance from the midpoint to the top threshold and the bottom threshold.

Clause 24: The method of any of clauses 17-23, further comprising coding a geometry data unit header (GDH) including data that overrides or refines the data of the GPS for the at least one of the top threshold or the bottom threshold.

Clause 25: The method of any of clauses 2-24, wherein determining the top threshold and the bottom threshold comprises: determining a maximum histogram height value, max_box_t; determining a minimum histogram height value, min_box_t; determining a histogram scale value, hist_scale; determining a histogram bin size value, hist_bin_size, according to int((max_box_t−min_box_t)/hist_scale); generating a histogram of the points with height values in the range from min_box_t to max_box_t; calculating a standard deviation of the histogram; determining a bin having a maximum number of height values in the histogram; and determining the top threshold and the bottom threshold according to offsets from the bin having the maximum number of height values, the offsets being defined according to respective multiples of the standard deviation.

Clause 26: A method of coding point cloud data, the method comprising: determining a first class associated with a first slice of a frame of point cloud data, the first slice including first one or more points; determining that the first one or more points correspond to the first class; coding the first one or more points according to the determination that the first one or more points correspond to the first class; determining a second class associated with a second slice of the frame of point cloud data, the second slice including second one or more points; determining that the second one or more points correspond to the second class; and coding the second one or more points according to the determination that the second one or more points correspond to the second class.

Clause 27: A method comprising a combination of the method of any of clauses 1-25 and the method of clause 26.

Clause 28: The method of any of clauses 26 and 27, further comprising: determining a third class associated with a third slice of the frame of point cloud data, the third slice including third one or more points; determining that the third one or more points correspond to the third class; and coding the third one or more points according to the determination that the third one or more points correspond to the third class.

Clause 29: The method of any of clauses 26-28, wherein the first class and second class comprise at least one of road, divider, nearby vehicle, building, sign, traffic lights, or pedestrian.

Clause 30: The method of any of clauses 26-29, further comprising coding data representing a slice group for the first slice, wherein coding the first one or more points comprises coding the first one or more points and other points included in one or more other slices corresponding to the slice group together.

Clause 31: The method of clause 30, further comprising: determining a third class associated with a third slice of the frame of point cloud data, the third slice being one of the one or more other slices corresponding to the slice group; and coding third one or more points of the third slice together with the first one or more points.

Clause 32: The method of any of clauses 30 and 31, further comprising coding index values for each of the slices representing a corresponding slice group.

Clause 33: The method of any of clauses 26-32, wherein coding the first one or more points comprises predicting at least one of the first one or more points from third one or more points of a third slice.

Clause 34: The method of clause 33, wherein the frame comprises a first frame, and the third slice forms part of a second frame different than the first frame.

Clause 35: The method of any of clauses 26-34, further comprising determining respective motion parameters for each of the first one or more points and the second one or more points.

Clause 36: A method of coding point cloud data, the method comprising: determining one or more regions of a frame of point cloud data; and for each of the regions: coding data representing respective motion parameters for the region; and coding points of the region using the respective motion parameters for the region.

Clause 37: A method comprising a combination of the method of any of clauses 1-35 and the method of clause 36.

Clause 38: The method of any of clauses 36 and 37, further comprising coding data representing a number of the regions included in the frame.

Clause 39: The method of any of clauses 36-38, further comprising coding parameters specifying each of the regions of the frame.

Clause 40: The method of clause 39, wherein the parameters include at least one of an upper bound or a lower bound for one or more of an x-coordinate of the region, a y-coordinate of the region, or a z-coordinate of the region.

Clause 41: The method of any of clauses 39 and 40, further comprising determining default values for one or more coordinates of the region.

Clause 42: The method of any of clauses 36-41, wherein coding the points of the region comprises applying motion compensation to the points of the region using the respective motion parameters.

Clause 43: A method of coding point cloud data, the method comprising: determining height values of points in a point cloud; classifying the points into a set of ground points or a set of object points according to the height values; and coding the ground points and the object points according to the classifications.

Clause 44: The method of clause 43, wherein classifying the points comprises: determining a top threshold and a bottom threshold; classifying points having height values between the top threshold and the bottom threshold into the set of ground points; and classifying points having height values above the top threshold or below the bottom threshold into the set of object points.

Clause 45: The method of clause 43, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 46: The method of clause 45, wherein the $i^{th}$ value range comprises an $i^{th}$ value range of N value ranges.

Clause 47: The method of clause 45, wherein $x\_min_i$ and $y\_min_i$ have values of negative infinity, and $x\_max_i$ and $y\_max_i$ have values of infinity.

Clause 48: The method of clause 44, wherein coding the ground points and the object points further comprises: quantizing the ground points and the object points by a scaling factor; and quantizing the top threshold and the bottom threshold by the scaling factor.

Clause 49: The method of clause 44, wherein coding the object points comprises: deriving a set of global motion for the object points; and predicting the object points using the set of global motion.

Clause 50: The method of clause 49, wherein deriving the set of global motion comprises deriving the set of global motion only from the object points.

Clause 51: The method of clause 50, wherein the set of global motion comprises a first set of global motion, and wherein coding the ground points comprises: deriving a second set of global motion for the ground points; and predicting the ground points using the second set of global motion.

Clause 52: The method of clause 51, wherein deriving the second set of global motion comprises deriving the second set of global motion only from the ground points.

Clause 53: The method of clause 49, wherein deriving the set of global motion comprises deriving a rotation matrix and a translation vector, and wherein coding the object points comprises applying the rotation matrix and the translation vector to reference points of a reference frame.

Clause 54: The method of clause 53, wherein coding the object points further comprises: determining local node motion vectors of nodes of a prediction tree, the nodes including respective sets of reference points of the reference frame; and applying the local node motion vectors to the nodes.

Clause 55: The method of clause 44, wherein determining the top threshold and the bottom threshold comprises determining the top threshold and the bottom threshold for a group of pictures (GOP) including a plurality of frames including the point cloud.

Clause 56: The method of clause 44, wherein determining the top threshold and the bottom threshold comprises determining the top threshold and the bottom threshold for a sequence parameter set (SPS) corresponding to a plurality of frames including the point cloud.

Clause 57: The method of clause 56, wherein determining the top threshold and the bottom threshold comprises determining the top threshold and the bottom threshold for an ordinal first frame of the plurality of frames.

Clause 58: The method of clause 56, wherein determining the top threshold and the bottom threshold comprises determining the top threshold and the bottom threshold as a weighted average of threshold for the plurality of frames.

Clause 59: The method of clause 44, further comprising coding a global parameter set (GPS) including data representing at least one of the top threshold or the bottom threshold.

Clause 60: The method of clause 59, wherein coding the GPS comprises coding a value for the top threshold and a flag indicating whether data is to be coded for the bottom threshold.

Clause 61: The method of clause 59, wherein coding the data for the at least one of the top threshold or the bottom threshold comprises: coding a value for a geom_globmotion_threshold0 representing the top threshold; and coding a value for a geom_globmotion_threshold1 representing the bottom threshold.

Clause 62: The method of clause 59, wherein coding the data representing the at least one of the top threshold or the bottom threshold comprises coding the data representing the at least one of the top threshold or the bottom threshold using respective unsigned integer $0^{th}$ order Exp-Golomb values.

Clause 63: The method of clause 59, wherein coding the data representing the at least one of the top threshold or the bottom threshold comprises coding the data representing the at least one of the top threshold or the bottom threshold using respective signed integer $0^{th}$ order Exp-Golomb values.

Clause 64: The method of clause 59, wherein coding the data representing the at least one of the top threshold or the bottom threshold comprises coding the data representing the at least one of the top threshold or the bottom threshold using respective signed fixed length values, the method further comprising coding data representing a number of bits assigned to the at least one of the top threshold or the bottom threshold.

Clause 65: The method of clause 59, wherein coding the data representing the at least one of the top threshold or the bottom threshold comprises: coding data representing a midpoint between the top threshold and the bottom threshold; and coding data representing a distance from the midpoint to the top threshold and the bottom threshold.

Clause 66: The method of clause 59, further comprising coding a geometry data unit header (GDH) including data that overrides or refines the data of the GPS for the at least one of the top threshold or the bottom threshold.

Clause 67: The method of clause 44, wherein determining the top threshold and the bottom threshold comprises: determining a maximum histogram height value, max_box_t; determining a minimum histogram height value, min_box_t; determining a histogram scale value, hist_scale; determining a histogram bin size value, hist_bin_size, according to int((max_box_t−min_box_t)/hist_scale); generating a histogram of the points with height values in the range from min_box_t to max_box_t; calculating a standard deviation of the histogram; determining a bin having a maximum number of height values in the histogram; and determining the top threshold and the bottom threshold according to offsets from the bin having the maximum number of height values, the offsets being defined according to respective multiples of the standard deviation.

Clause 68: A method of coding point cloud data, the method comprising: determining a first class associated with a first slice of a frame of point cloud data, the first slice including first one or more points; determining that the first one or more points correspond to the first class; coding the first one or more points according to the determination that the first one or more points correspond to the first class; determining a second class associated with a second slice of the frame of point cloud data, the second slice including second one or more points; determining that the second one or more points correspond to the second class; and coding the second one or more points according to the determination that the second one or more points correspond to the second class.

Clause 69: The method of clause 68, further comprising: determining a third class associated with a third slice of the frame of point cloud data, the third slice including third one or more points; determining that the third one or more points correspond to the third class; and coding the third one or more points according to the determination that the third one or more points correspond to the third class.

Clause 70: The method of clause 68, wherein the first class and second class comprise at least one of road, divider, nearby vehicle, building, sign, traffic lights, or pedestrian.

Clause 71: The method of clause 68, further comprising coding data representing a slice group for the first slice, wherein coding the first one or more points comprises coding the first one or more points and other points included in one or more other slices corresponding to the slice group together.

Clause 72: The method of clause 71, further comprising: determining a third class associated with a third slice of the frame of point cloud data, the third slice being one of the one or more other slices corresponding to the slice group; and coding third one or more points of the third slice together with the first one or more points.

Clause 73: The method of clause 71, further comprising coding index values for each of the slices representing a corresponding slice group.

Clause 74: The method of clause 68, wherein coding the first one or more points comprises predicting at least one of the first one or more points from third one or more points of a third slice.

Clause 75: The method of clause 74, wherein the frame comprises a first frame, and the third slice forms part of a second frame different than the first frame.

Clause 76: The method of any of clauses 68, further comprising determining respective motion parameters for each of the first one or more points and the second one or more points.

Clause 77: A method of coding point cloud data, the method comprising: determining one or more regions of a frame of point cloud data; and for each of the regions: coding data representing respective motion parameters for the region; and coding points of the region using the respective motion parameters for the region.

Clause 78: The method of clause 77, further comprising coding data representing a number of the regions included in the frame.

Clause 79: The method of clause 77, further comprising coding parameters specifying each of the regions of the frame.

Clause 80: The method of clause 79, wherein the parameters include at least one of an upper bound or a lower bound for one or more of an x-coordinate of the region, a y-coordinate of the region, or a z-coordinate of the region.

Clause 81: The method of clause 79, further comprising determining default values for one or more coordinates of the region.

Clause 82: The method of clause 77, wherein coding the points of the region comprises applying motion compensation to the points of the region using the respective motion parameters.

Clause 83: The method of any of clauses 1-82, wherein coding comprises decoding.

Clause 84: The method of any of clauses 1-83, wherein coding comprises encoding.

Clause 85: A device for decoding point cloud data, the device comprising one or more means for performing the method of any of clauses 1-84.

Clause 86: The device of clause 85, further comprising a display configured to display the point cloud data.

Clause 87: The device of any of clauses 85 and 86, wherein the device comprises one or more of a camera, a computer, a mobile device, a broadcast receiver device, or a set-top box.

Clause 88: The device of clause 85-87, further comprising a memory configured to store the point cloud data.

Clause 89: A computer-readable storage medium having stored thereon instructions that, when executed, cause a processor to perform the method of any of clauses 1-84.

Clause 90: A device for coding point cloud data, the device comprising: means for determining height values of points in a point cloud; classifying the points into a set of ground points or a set of object points according to the height values; and coding the ground points and the object points according to the classifications.

Clause 91: The device of clause 90, wherein the means for classifying the points comprises: means for determining a top threshold and a bottom threshold; means for classifying points having height values between the top threshold and the bottom threshold into the set of ground points; and means for classifying points having height values above the top threshold or below the bottom threshold into the set of object points.

Clause 92: A device for coding point cloud data, the device comprising: means for determining a first class associated with a first slice of a frame of point cloud data, the first slice including first one or more points; means for determining that the first one or more points correspond to the first class; means for coding the first one or more points according to the determination that the first one or more points correspond to the first class; means for determining a second class associated with a second slice of the frame of point cloud data, the second slice including second one or more points; means for determining that the second one or more points correspond to the second class; and means for coding the second one or more points according to the determination that the second one or more points correspond to the second class.

Clause 93: A device for coding point cloud data, the device comprising: means for determining one or more regions of a frame of point cloud data; means for coding data representing respective motion parameters for each of the regions; and means for coding points of each of the regions using the respective motion parameters for the region including the points.

Clause 94: A method of coding point cloud data, the method comprising: determining height values of points in a point cloud; classifying the points into a set of ground points or a set of object points according to the height values; and coding the ground points and the object points according to the classifications.

Clause 95: The method of clause 94, wherein coding the object points comprises: deriving a set of global motion information for the object points; and predicting the object points using the set of global motion information.

Clause 96: The method of clause 95, wherein deriving the set of global motion information comprises deriving the set of global motion information only for the object points.

Clause 97: The method of clause 95, wherein the set of global motion information comprises a first set of global motion information, and wherein coding the ground points comprises: deriving a second set of global motion information for the ground points; and predicting the ground points using the second set of global motion information.

Clause 98: The method of clause 97, wherein deriving the second set of global motion information comprises deriving the second set of global motion information only for the ground points.

Clause 99: The method of clause 95, wherein deriving the set of global motion information comprises deriving a rotation matrix and a translation vector, and wherein coding the object points comprises applying the rotation matrix and the translation vector to reference points of a reference frame.

Clause 100: The method of clause 99, wherein coding the object points further comprises: determining local node motion vectors of nodes of a prediction tree, the nodes including respective sets of reference points of the reference frame; and applying the local node motion vectors to the nodes.

Clause 101: The method of clause 94, wherein classifying the points comprises: determining a top threshold and a bottom threshold; classifying points having height values between the top threshold and the bottom threshold into the set of ground points; and classifying points having height values above the top threshold or below the bottom threshold into the set of object points.

Clause 102: The method of clause 101, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 103: The method of clause 102, wherein the $i^{th}$ value range comprises an $i^{th}$ value range of N value ranges.

Clause 104: The method of clause 102, wherein $x\_min_i$ and $y\_min_i$ have values of negative infinity, and $x\_max_i$ and $y\_max_i$ have values of infinity.

Clause 105: The method of clause 101, wherein coding the ground points and the object points further comprises: quantizing the ground points and the object points by a scaling factor; and quantizing the top threshold and the bottom threshold by the scaling factor.

Clause 106: The method of clause 101, wherein determining the top threshold and the bottom threshold comprises determining the top threshold and the bottom threshold for a group of pictures (GOP) including a plurality of frames including the point cloud.

Clause 107: The method of clause 101, wherein determining the top threshold and the bottom threshold comprises determining the top threshold and the bottom threshold for a sequence parameter set (SPS) corresponding to a plurality of frames including the point cloud.

Clause 108: The method of clause 106, wherein determining the top threshold and the bottom threshold comprises determining the top threshold and the bottom threshold for an ordinal first frame of the plurality of frames.

Clause 109: The method of clause 106, wherein determining the top threshold and the bottom threshold comprises determining the top threshold and the bottom threshold as a weighted average of thresholds for the plurality of frames.

Clause 110: The method of clause 101, further comprising coding a data structure including data representing at least one of the top threshold or the bottom threshold.

Clause 111: The method of clause 110, wherein coding the data structure comprises coding at least one of a sequence parameter set (SPS), a geometry parameter set (GPS), or a geometry data unit header (GDH).

Clause 112: The method of clause 110, wherein coding the data structure comprises coding a value for the top threshold and a flag indicating whether data is to be coded for the bottom threshold.

Clause 113: The method of clause 110, wherein coding the data for the at least one of the top threshold or the bottom threshold comprises: coding a value for a geom_globmotion_threshold0 representing the top threshold; and coding a value for a geom_globmotion_threshold1 representing the bottom threshold.

Clause 114: The method of clause 110, wherein coding the data representing the at least one of the top threshold or the bottom threshold comprises coding the data representing the at least one of the top threshold or the bottom threshold using respective unsigned integer 0th order Exp-Golomb values.

Clause 115: The method of clause 110, wherein coding the data representing the at least one of the top threshold or the bottom threshold comprises coding the data representing the at least one of the top threshold or the bottom threshold using respective signed integer 0th order Exp-Golomb values.

Clause 116: The method of clause 110, wherein coding the data representing the at least one of the top threshold or the bottom threshold comprises coding the data representing the at least one of the top threshold or the bottom threshold using respective signed fixed length values, the method further comprising coding data representing a number of bits assigned to the at least one of the top threshold or the bottom threshold.

Clause 117: The method of clause 110, wherein coding the data representing the at least one of the top threshold or the bottom threshold comprises: coding data representing a midpoint between the top threshold and the bottom threshold; and coding data representing a distance from the midpoint to the top threshold and the bottom threshold.

Clause 118: The method of clause 110, further comprising coding a geometry data unit header (GDH) including data that overrides or refines the data of the data structure for the at least one of the top threshold or the bottom threshold.

Clause 119: The method of clause 101, wherein determining the top threshold and the bottom threshold comprises: determining a maximum histogram height value, max_box_t; determining a minimum histogram height value, min_box_t; determining a histogram scale value, hist_scale; determining a histogram bin size value, hist_bin_size, according to int((max_box_t−min_box_t)/hist_scale); generating a histogram of the points with height values in the range from min_box_t to max_box_t; calculating a standard deviation of the histogram; determining a bin having a maximum number of height values in the histogram; and determining the top threshold and the bottom threshold according to offsets from the bin having the maximum number of height values, the offsets being defined according to respective multiples of the standard deviation.

Clause 120: A device for coding point cloud data, the device comprising: a memory configured to store data representing points of a point cloud; and one or more processors implemented in circuitry and configured to: determine height values of points in a point cloud; classify the points into a set of ground points or a set of object points according to the height values; and code the ground points and the object points according to the classifications.

Clause 121: The device of clause 120, wherein to code the object points, the one or more processors are configured to: derive a set of global motion information for the object points; and predict the object points using the set of global motion information.

Clause 122: The device of clause 121, wherein the one or more processors are configured to derive the set of global motion information only for the object points.

Clause 123: The device of clause 121, wherein the set of global motion information comprises a first set of global motion information, and wherein to code the ground points, the one or more processors are configured to: derive a second set of global motion information for the ground points; and predict the ground points using the second set of global motion information.

Clause 124: The device of clause 123, wherein the one or more processors are configured to derive the second set of global motion information only for the ground points.

Clause 125: The device of clause 121, wherein to derive the set of global motion information, the one or more processors are configured to derive a rotation matrix and a translation vector, and wherein to code the object points, the one or more processors are configured to apply the rotation matrix and the translation vector to reference points of a reference frame.

Clause 126: The device of clause 125, wherein to code the object points, the one or more processors are further configured to: determine local node motion vectors of nodes of a prediction tree, the nodes including respective sets of reference points of the reference frame; and apply the local node motion vectors to the nodes.

Clause 127: The device of clause 120, wherein to classify the points, the one or more processors are configured to: determine a top threshold and a bottom threshold; classify points having height values between the top threshold and the bottom threshold into the set of ground points; and classify points having height values above the top threshold or below the bottom threshold into the set of object points.

Clause 128: The device of clause 127, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 129: The device of clause 128, wherein the $i^{th}$ value range comprises an $i^{th}$ value range of N value ranges.

Clause 130: The device of clause 128, wherein $x\_min_i$ and $y\_min_i$ have values of negative infinity, and $x\_max_i$ and $y\_max_i$ have values of infinity.

Clause 131: The device of clause 127, wherein to classify the ground points and the object points, the one or more processors are further configured to: quantize the ground points and the object points by a scaling factor; and quantize the top threshold and the bottom threshold by the scaling factor.

Clause 132: The device of clause 127, wherein the one or more processors are further configured to code a data structure including data representing at least one of the top threshold or the bottom threshold.

Clause 133: A method of coding point cloud data, the method comprising: determining height values of points in a point cloud; classifying the points into a set of ground points or a set of object points according to the height values; and coding the ground points and the object points according to the classifications.

Clause 134: The method of clause 133, wherein coding the object points comprises: deriving a set of global motion information for the object points; and predicting the object points using the set of global motion information.

Clause 135: The method of clause 134, wherein deriving the set of global motion information comprises deriving the set of global motion information only for the object points.

Clause 136: The method of any of clauses 134 and 135, wherein the set of global motion information comprises a first set of global motion information, and wherein coding the ground points comprises: deriving a second set of global motion information for the ground points; and predicting the ground points using the second set of global motion information.

Clause 137: The method of clause 136, wherein deriving the second set of global motion information comprises deriving the second set of global motion information only for the ground points.

Clause 138: The method of any of clauses 134-137, wherein deriving the set of global motion information comprises deriving a rotation matrix and a translation vector, and wherein coding the object points comprises applying the rotation matrix and the translation vector to reference points of a reference frame.

Clause 139: The method of clause 138, wherein coding the object points further comprises: determining local node motion vectors of nodes of a prediction tree, the nodes including respective sets of reference points of the reference frame; and applying the local node motion vectors to the nodes.

Clause 140: The method of any of clauses 133-139, wherein classifying the points comprises: determining a top threshold and a bottom threshold; classifying points having height values between the top threshold and the bottom threshold into the set of ground points; and classifying points having height values above the top threshold or below the bottom threshold into the set of object points.

Clause 141: The method of clause 140, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 142: The method of clause 141, wherein the $i^{th}$ value range comprises an $i^{th}$ value range of N value ranges.

Clause 143: The method of any of clauses 141 and 142, wherein $x\_min_i$ and $y\_min_i$ have values of negative infinity, and $x\_max_i$ and $y\_max_i$ have values of infinity.

Clause 144: The method of any of clauses 134-143, wherein coding the ground points and the object points further comprises: quantizing the ground points and the object points by a scaling factor; and quantizing the top threshold and the bottom threshold by the scaling factor.

Clause 145: The method of any of clause 140-144, wherein determining the top threshold and the bottom threshold comprises determining the top threshold and the bottom threshold for a group of pictures (GOP) including a plurality of frames including the point cloud.

Clause 146: The method of any of clauses 140-145, wherein determining the top threshold and the bottom threshold comprises determining the top threshold and the bottom threshold for a sequence parameter set (SPS) corresponding to a plurality of frames including the point cloud.

Clause 147: The method of any of clauses 140-144, wherein determining the top threshold and the bottom threshold comprises determining the top threshold and the bottom threshold for an ordinal first frame of the plurality of frames.

Clause 148: The method of any of clause 140-146, wherein determining the top threshold and the bottom threshold comprises determining the top threshold and the bottom threshold as a weighted average of thresholds for the plurality of frames.

Clause 149: The method of any of clauses 140-148, further comprising coding a data structure including data representing at least one of the top threshold or the bottom threshold.

Clause 150: The method of clause 149, wherein coding the data structure comprises coding at least one of a sequence parameter set (SPS), a geometry parameter set (GPS), or a geometry data unit header (GDH).

Clause 151: The method of any of clauses 149 and 150, wherein coding the data structure comprises coding a value for the top threshold and a flag indicating whether data is to be coded for the bottom threshold.

Clause 152: The method of any of clauses 149-151, wherein coding the data for the at least one of the top threshold or the bottom threshold comprises: coding a value for a geom_globmotion_threshold0 representing the top threshold; and coding a value for a geom_globmotion_threshold1 representing the bottom threshold.

Clause 153: The method of any of clauses 149-152, wherein coding the data representing the at least one of the top threshold or the bottom threshold comprises coding the data representing the at least one of the top threshold or the bottom threshold using respective unsigned integer 0th order Exp-Golomb values.

Clause 154: The method of any of clauses 149-152, wherein coding the data representing the at least one of the top threshold or the bottom threshold comprises coding the data representing the at least one of the top threshold or the bottom threshold using respective signed integer 0th order Exp-Golomb values.

Clause 155: The method of any of clauses 149-152, wherein coding the data representing the at least one of the top threshold or the bottom threshold comprises coding the data representing the at least one of the top threshold or the bottom threshold using respective signed fixed length values, the method further comprising coding data representing a number of bits assigned to the at least one of the top threshold or the bottom threshold.

Clause 156: The method of any of clauses 149-155, wherein coding the data representing the at least one of the top threshold or the bottom threshold comprises: coding data representing a midpoint between the top threshold and the bottom threshold; and coding data representing a distance from the midpoint to the top threshold and the bottom threshold.

Clause 157: The method of any of clauses 149-156, further comprising coding a geometry data unit header (GDH) including data that overrides or refines the data of the data structure for the at least one of the top threshold or the bottom threshold.

Clause 158: The method of any of clauses 133-157, wherein determining the top threshold and the bottom threshold comprises: determining a maximum histogram height value, max_box_t; determining a minimum histogram height value, min_box_t; determining a histogram scale value, hist_scale; determining a histogram bin size value, hist_bin_size, according to int ((max_box_t−min_box_t)/hist_scale); generating a histogram of the points with height values in the range from min_box_t to max_box_t; calculating a standard deviation of the histogram; determining a bin having a maximum number of height values in the histogram; and determining the top threshold and the bottom threshold according to offsets from the bin having the maximum number of height values, the offsets being defined according to respective multiples of the standard deviation.

Clause 159: A device for coding point cloud data, the device comprising: a memory configured to store data representing points of a point cloud; and one or more processors implemented in circuitry and configured to: determine height values of points in a point cloud; classify the points into a set of ground points or a set of object points according to the height values; and code the ground points and the object points according to the classifications.

Clause 160: The device of clause 159, wherein to code the object points, the one or more processors are configured to: derive a set of global motion information for the object points; and predict the object points using the set of global motion information.

Clause 161: The device of clause 160, wherein the one or more processors are configured to derive the set of global motion information only for the object points.

Clause 162: The device of any of clauses 160 and 161, wherein the set of global motion information comprises a first set of global motion information, and wherein to code the ground points, the one or more processors are configured to: derive a second set of global motion information for the ground points; and predict the ground points using the second set of global motion information.

Clause 163: The device of clause 162, wherein the one or more processors are configured to derive the second set of global motion information only for the ground points.

Clause 164: The device of any of clauses 160-163, wherein to derive the set of global motion information, the one or more processors are configured to derive a rotation matrix and a translation vector, and wherein to code the object points, the one or more processors are configured to apply the rotation matrix and the translation vector to reference points of a reference frame.

Clause 165: The device of clause 164, wherein to code the object points, the one or more processors are further configured to: determine local node motion vectors of nodes of a prediction tree, the nodes including respective sets of reference points of the reference frame; and apply the local node motion vectors to the nodes.

Clause 166: The device of any of clauses 159-165, wherein to classify the points, the one or more processors are configured to: determine a top threshold and a bottom threshold; classify points having height values between the top threshold and the bottom threshold into the set of ground points; and classify points having height values above the top threshold or below the bottom threshold into the set of object points.

Clause 167: The device of clause 166, wherein the top threshold comprises $z\_max_i$ and the bottom threshold comprises $z\_min_i$ of an $i^{th}$ value range $\{(x\_min_i, x\_max_i), (y\_min_i, y\_max_i), (z\_min_i, z\_max_i)\}$.

Clause 168: The device of clause 167, wherein the $i^{th}$ value range comprises an $i^{th}$ value range of N value ranges.

Clause 169: The device of any of clauses 167 and 168, wherein $x\_min_i$ and $y\_min_i$ have values of negative infinity, and $x\_max_i$ and $y\_max_i$ have values of infinity.

Clause 170: The device of any of clauses 166-169, wherein to the ground points and the object points, the one or more processors are further configured to: quantize the ground points and the object points by a scaling factor; and quantize the top threshold and the bottom threshold by the scaling factor.

Clause 171: The device of any of clauses 166-170, wherein the one or more processors are further configured to code a data structure including data representing at least one of the top threshold or the bottom threshold.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding point cloud data, the device comprising:
   a memory configured to store data representing points of a point cloud; and
   a processing system comprising one or more processors implemented in circuitry, the processing system configured to:
   determine height values of points in a point cloud;
   decode a data structure including data representing a top threshold and a bottom threshold;
   classify points having height values between the top threshold and the bottom threshold into the set of ground points;
   classify points having height values above the top threshold or below the bottom threshold into the set of object points;
   decode the ground points and the object points according to the classifications; and
   decode a geometry data unit header (GDH) that includes data that overrides or refines the data of the data structure for the at least one of (i) the top threshold or (ii) the bottom threshold.

2. The device of claim 1, wherein to decode the object points, the processing system is configured to:
   derive a set of global motion information for the object points; and
   predict the object points using the set of global motion information.

3. The device of claim 2, wherein to derive the set of global motion information, the processing system is configured to derive a rotation matrix and a translation vector, and wherein to decode the object points, the processing system is configured to apply the rotation matrix and the translation vector to reference points of a reference frame.

4. The device of claim 3, wherein to decode the object points, the processing system is further configured to:
   determine local node motion vectors of nodes of a prediction tree, the nodes including respective sets of reference points of the reference frame; and
   apply the local node motion vectors to the nodes.

5. The device of claim 1, wherein the processing system is configured to derive the set of global motion information only for the object points.

6. The device of claim 1, wherein the set of global motion information comprises a first set of global motion information, and wherein to decode the ground points, the processing system is configured to:
   derive a second set of global motion information for the ground points; and
   predict the ground points using the second set of global motion information.

7. The device of claim 6, wherein the processing system is configured to derive the second set of global motion information only for the ground points.

8. A device for encoding point cloud data, the device comprising:
   a memory configured to store data representing points of a point cloud; and
   a processing system comprising one or more processors implemented in circuitry, the processing system configured to:
   determine height values of points in a point cloud;
   encode a data structure including data representing a top threshold and a bottom threshold;
   classify points having height values between the top threshold and the bottom threshold into the set of ground points;
   classify points having height values above the top threshold or below the bottom threshold into the set of object points;
   encode the ground points and the object points according to the classifications,
   encode a geometry data unit header (GDH) that includes data that overrides or refines the data of the data structure for the at least one of (i) the top threshold or (ii) the bottom threshold.

9. The device of claim 8, wherein to encode the object points, the processing system is configured to:
   derive a set of global motion information for the object points; and
   predict the object points using the set of global motion information.

10. The device of claim 9, wherein to derive the set of global motion information, the processing system is configured to derive a rotation matrix and a translation vector, and wherein to encode the object points, the processing system is configured to apply the rotation matrix and the translation vector to reference points of a reference frame.

11. The device of claim 10, wherein to encode the object points, the processing system is further configured to:
   determine local node motion vectors of nodes of a prediction tree, the nodes including respective sets of reference points of the reference frame; and
   apply the local node motion vectors to the nodes.

12. The device of claim 8, wherein the processing system is configured to derive the set of global motion information only for the object points.

13. The device of claim 8, wherein the set of global motion information comprises a first set of global motion information, and wherein to encode the ground points, the processing system is configured to:
   derive a second set of global motion information for the ground points; and
   predict the ground points using the second set of global motion information.

14. The device of claim 13, wherein the processing system is configured to derive the second set of global motion information only for the ground points.

15. A method of coding point cloud data, the method comprising:
   determining height values of points in a point cloud;
   coding a data structure including data representing a top threshold and a bottom threshold;

classifying points having height values between the top threshold and the bottom threshold into the set of ground points;

classifying points having height values above the top threshold or below the bottom threshold into the set of object points;

coding the ground points and the object points according to the classifications; and coding a geometry data unit header (GDH) that includes data that overrides or refines the data of the data structure for the at least one of (i) the top threshold or (ii) the bottom threshold.

16. The method of claim 15, wherein coding the object points comprises:

deriving a set of global motion information for the object points; and predicting the object points using the set of global motion information.

17. The method of claim 16, wherein deriving the set of global motion information comprises deriving the set of global motion information only for the object points.

18. The method of claim 16, wherein the set of global motion information comprises a first set of global motion information, and wherein coding the ground points comprises:

deriving a second set of global motion information for the ground points; and predicting the ground points using the second set of global motion information.

19. The method of claim 15, wherein the coding includes encoding.

20. The method of claim 15, wherein the coding includes decoding.

* * * * *